United States Patent
Botchkarev

(10) Patent No.: US 6,912,316 B2
(45) Date of Patent: Jun. 28, 2005

(54) DATA COMPRESSION AND RECONSTRUCTION METHODS AND APPARATUSES FOR HARD COPY DEVICE

(75) Inventor: Serafim Botchkarev, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 921 days.

(21) Appl. No.: 09/880,921

(22) Filed: Jun. 15, 2001

(65) Prior Publication Data

US 2002/0085227 A1 Jul. 4, 2002

(30) Foreign Application Priority Data

Dec. 29, 2000 (KR) .......................... 2000-86282

(51) Int. Cl.$^7$ ................................. G06K 9/46
(52) U.S. Cl. ............... 382/232; 382/242; 382/197; 358/1.15; 341/60; 341/95; 707/101
(58) Field of Search ................ 382/232, 233, 382/197, 242, 243, 248, 276, 305, 1.15; 341/106, 51, 60, 95; 707/101–102, 104.1; 375/240.01, 240.02, 240.03, 240.18, 240.22

(56) References Cited

U.S. PATENT DOCUMENTS 5,442,350 A * 8/1995 Iyer et al. .................. 341/51
5,951,623 A * 9/1999 Reynar et al. .............. 708/203
6,414,610 B1 * 7/2002 Smith ....................... 341/106

* cited by examiner

Primary Examiner—Kanjibhai Patel
Assistant Examiner—Ali Bayat
(74) Attorney, Agent, or Firm—Robert E. Bushnell, Esq.

(57) ABSTRACT

Data compression and reconstruction methods and apparatuses for a hard copy device are provided. The data compression method of compressing source image data, which is used for hard copying a bilevel screened image and stored in a memory in units of bytes, for a hard copy device, includes the steps of transposing bytes at each column to bytes at each row in the source image data; and entropy encoding sequential chains, which include a current chain to be compressed and a chain or chains succeeding the current chain, or the current chain depending on whether a chain having the same value as that of the current chain exists in a dictionary composed of previous chains compressed before, and determining the result of the entropy encoding as the result of the compression. Neighboring bytes at each row have neighboring memory addresses. The offset of neighboring bytes at each column corresponds to the row width of the source image data. Start information containing information on a chain which compression is performed on the source image data starting from and header information are determined before the latter step and included in the result of the compression, and each chain is composed of at least two consecutive bytes at a row. Transposition is performed before entropy decoding source image data, thereby improving the compression ratio, and the size of a template can be arbitrarily controlled, thereby improving the compression speed.

36 Claims, 16 Drawing Sheets

FIG. 3

|  | 30 | 34 |  | 38 |
|---|---|---|---|---|
|  | [1,1] | [1,2] | ... | [1,q] |
| 32— | [2,1] | [2,2] | ... | [2,q] |
|  | ⋮ | ⋮ | ... | ⋮ |
| 36— | [p,1] | [p,2] | ... | [p,q] |

FIG. 4

| 40 | 42 |  |  |
|---|---|---|---|
| [1,1] | [2,1] | ... | [p,1] |
| [1,2] | [2,2] | ... | [p,2] |
| ⋮ | ⋮ | ... | ⋮ |
| [1,q] | [2,q] | ... | [p,q] |

| 0 | 1 | 2 | 3 | 4 | 5 | 6 | 7 |
|---|---|---|---|---|---|---|---|
| 1st BYTE | | | | | | | |

FIG. 16B

| 0 | 1 | 2 | 3 | 4 | 5 | 6 | 7 |
|---|---|---|---|---|---|---|---|
| 2nd BYTE (OPTIONAL) | | | | | | | |

FIG. 17

| 0 | 1 | 2 | 3 | 4 | 5 | 6 | 7 |
|---|---|---|---|---|---|---|---|
| i | | | COUNT1 OR COUNT2 | | | | |

FIG. 18A

| 0 | 1 | 2 | 3 | 4 | 5 | 6 | 7 |
|---|---|---|---|---|---|---|---|
| i | | | | COUNT1 OR COUNT2 | | | |

FIG. 18B

| 0 | 1 | 2 | 3 | 4 | 5 | 6 | 7 |
|---|---|---|---|---|---|---|---|
| COUNTA(OPTIONAL) | | | | | | | |

FIG. 19A

| 0 | 1 | 2 | 3 | 4 | 5 | 6 | 7 |
|---|---|---|---|---|---|---|---|
| i | | | | | COUNT1 OR COUNT2 | | |

FIG. 19B

| 0 | 1 | 2 | 3 | 4 | 5 | 6 | 7 |
|---|---|---|---|---|---|---|---|
| COUNTA(OPTIONAL) | | | | | | | |

| 0 | 1 | 2 | 3 | 4 | 5 | 6 | 7 |
|---|---|---|---|---|---|---|---|
| i | | | | | | COUNT1 OR COUNT2 | |

| 0 | 1 | 2 | 3 | 4 | 5 | 6 | 7 |
|---|---|---|---|---|---|---|---|
| COUNTA(OPTIONAL) | | | | | | | |

DATA COMPRESSION AND RECONSTRUCTION METHODS AND APPARATUSES FOR HARD COPY DEVICE

CLAIM OF PRIORITY

This application makes reference to, incorporates the same herein, and claims all benefits accruing under 35 U.S.C. §119 from my application METHODS AND APPARATUSES FOR COMPRESSING AND RECOVERING DATA FOR HARD COPY APPARATUS filed with the Korean Industrial Property Office on Dec. 29, 2000 and there duly assigned Ser. No. 86282/2000.

BACKGROUND OF THE INVENTION

1. Technical Field

The present invention relates to a hard copy device capable of printing on a transparent medium, and more particularly, to methods of compressing and reconstructing data used in a hard copy device and apparatuses for performing the methods.

2. Related Art

The spatial resolution of a printer can be not very high, that is, 600 or 1200 dots per inch (dpi). On the contrary, the spatial resolution of hard copy devices can be very high up to about 12000 dpi. However, hard copy devices having such high spatial resolution can have a low data compression ratio and a slow and unvariable compression speed for hard copy.

SUMMARY OF THE INVENTION

To solve the above problems, it is a first object of the present invention to provide a data compression method for a hard copy device, through which data used for hard-copying a bilevel screened image can be quickly and efficiently compressed.

It is a second object of the present invention to provide a data compression apparatus for performing the data compression method for a hard copy device.

It is a third object of the present invention to provide a method of reconstructing data, which has been compressed according to the above data compression method, in a hard copy device.

It is a fourth object of the present invention to provide a data reconstruction apparatus for performing the above data reconstruction method for a hard copy device.

Accordingly, to achieve the first object of the invention, there is provided a method of compressing source image data, which is used for hard copying a bilevel screened image and stored in a memory in units of bytes, for a hard copy device. The method includes the steps of (a) transposing bytes at each column to bytes at each row in the source image data; and (b) entropy encoding sequential chains, which include a current chain to be compressed and a chain or chains succeeding the current chain, or the current chain depending on whether a chain having the same value as that of the current chain exists in a dictionary composed of previous chains compressed before, and determining the result of the entropy encoding as the result of the compression. Here, neighboring bytes at each row have neighboring memory addresses, the offset of neighboring bytes at each column corresponds to the row width of the source image data, start information containing information on a chain which compression is performed on the source image data starting from and header information are determined before the step (b) and included in the result of the compression, and each chain is composed of at least two consecutive bytes at a row.

To achieve the second object of the invention, there is provided an apparatus for compressing source image data, which is used for hard copying a bilevel screened image and stored in a memory in units of bytes, in a hard copy device. The apparatus includes a first data transposer for receiving the source image data, transposing bytes at each column to bytes at each row in the source image data and outputting the result of the transposition; a template determiner for receiving the result of the transposition from the first data transposer and determining a template which is composed of previous chains whose values are the same as or similar to that of a current chain to be currently compressed, the previous chains having been compressed before the current chain is compressed; and an entropy encoder for inspecting the template received from the template determiner to determine whether the template has chains having the same value as the current value received from the first data transposer, in response to start information containing information on a chain to be first compressed, entropy encoding sequential chains composed of the current chain and a chain or chains succeeding the current chain or the current chain in response to the result of the inspection, and outputting the result of the entropy encoding as the result of compressing the source image data. Here, neighboring bytes at each row have neighboring memory addresses, the offset of neighboring bytes at each column corresponds to the row width of the source image data, the start information and header information are predetermined, provided to the entropy encoder and included in the result of the compression, and each chain is composed of at least two consecutive bytes at a row.

To achieve the third object of the invention, there is provided a method of reconstructing original source image data from the source image data compressed by the above compression apparatus, for a hard copy device. The method includes the steps (d) extracting the header and the start information from the compressed source image data; (e) entropy decoding compressed chains contained in the chunk data and the chain data which are extracted from the compressed source image data, using the header and the start information extracted in the step (d); and (f) transposing bytes at each column to bytes at each row in the result of the entropy decoding and determining the result of the transposition as reconstructed source image data.

To achieve the fourth object of the invention, there is provided an apparatus of reconstructing original source image data from the source image data compressed by the above compression apparatus, for a hard copy device. The apparatus includes an information extractor for extracting the header and the start information from the compressed source image data which is input; an entropy decoder for entropy decoding compressed chains contained in the chunk data and the chain data which are extracted from the compressed source image data, in response to the header and the start information received from the information extractor, and outputting the result of the entropy decoding; and a second data transposer for transposing bytes at each column to bytes at each row in the result of the entropy decoding received from the entropy decoder, and outputting the result of the transposition as reconstructed source image data.

To achieve these and other objects in accordance with the principles of the present invention, as embodied and broadly described, the present invention provides a method of compressing source image data for a hard copy device, the method comprising: storing the source image data in units of bytes, in a memory in rows and columns; transposing bytes at each column of the source image data to bytes at each row of the source image data; determining start information, said start information containing header information and containing information on a chain that was the starting point where compression on the source image data is started; encoding a plurality of sequential chains and generating compressed data including said encoded chains; each one of said sequential chains corresponding to one selected from among a current chain alone and the current chain with at least one chain succeeding the current chain, said selecting being in dependence upon whether a dictionary contains chains having same value as the current chain, the dictionary being composed of chains preceding the current chain; and including said start information in said compressed data, each chain being composed of at least two consecutive bytes at a row, neighboring bytes at each row having neighboring memory addresses, offset of neighboring bytes at each column corresponding to width of row of the source image data.

To achieve these and other objects in accordance with the principles of the present invention, as embodied and broadly described, the present invention provides an apparatus for compressing source image data, the apparatus comprising: a first data transposer receiving the source image data, the source image data being stored in units of bytes in rows and columns, said first data transposer transposing bytes at each column to bytes at each row and outputting the result of the transposition; a template determiner receiving the result of the transposition from said first data transposer and determining a template, the template being composed of previous chains having values selected from among values that are the same as a current chain and values that are similar to the current chain, the current chain being the chain to be currently compressed, the previous chains having been compressed before the current chain is compressed; and an encoder inspecting the template received from said template determiner to determine whether the template has chains having the same value as the current value received from said first data transposer, said inspecting being performed in response to start information containing information on a chain to be first compressed, said encoder encoding sequential chains composed of one selected from among the current chain and the current chain with at least one chain succeeding the current chain, said encoding being performed in response to result of said inspecting, said encoder outputting result of said encoding as result of compressing the source image data; each chain being composed of at least two consecutive bytes at a row, neighboring bytes at each row having neighboring memory addresses, offset of neighboring bytes at each column corresponding to the row width of the source image data; the start information and header information being predetermined, provided to said encoder, and included in the result of the compression.

To achieve these and other objects in accordance with the principles of the present invention, as embodied and broadly described, the present invention provides a method of reconstructing original source image data from the compressed source image data, said reconstructing comprising: performing a first extracting process by extracting the header and the start information from the compressed source image data; performing a first decoding process by decoding compressed chains contained in the chunk data and the chain data which are extracted from the compressed source image data, using the header and the start information extracted by said first extracting; and performing a second transposing process by transposing bytes at each column to bytes at each row in the result of said first decoding and determining the result of the transposition as reconstructed source image data.

To achieve these and other objects in accordance with the principles of the present invention, as embodied and broadly described, the present invention provides a method of reconstructing original source image data from the compressed source image data, said reconstructing comprising: extracting the header and the start information from the compressed source image data which is input, said extracting being performed by an information extractor; entropy decoding compressed chains contained in the chunk data and the chain data which are extracted from the compressed source image data, in response to the header and the start information received from said information extractor, and outputting the result of the entropy decoding, said entropy decoding being performed by an entropy decoder connected to said information extractor; and performing a second transposing process by transposing bytes at each column to bytes at each row in the result of said entropy decoding received from said entropy decoder, and outputting the result of the transposition as reconstructed source image data.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 3 is a diagram illustrating a pattern in which the bytes of source image data are stored in a memory before transposition;

FIG. 4 is a diagram illustrating a pattern in which the bytes of source image data are stored in a memory after transposition;

FIG. 5 is a diagram illustrating a pattern in which chains are stored in a memory;

FIGS. 6 and 7 are diagrams illustrating examples of a template having a length 17;

FIGS. 16A and 16B are diagrams illustrating the formats of chunk data, in accordance with the principles of the present invention;

FIG. 17 is a diagram illustrating the format of chunk data when m=7;

FIGS. 18A and 18B are diagrams illustrating the format of chunk data when m=15;

FIGS. 19A and 19B are diagrams illustrating the formats of chunk data when m=31;

FIG. 24 is a diagram illustrating a pattern in which data is stored in a memory;

FIGS. 25A through 25C are diagrams illustrating patterns in which data is stored in a memory;

DETAILED DESCRIPTION OF THE PRESENT INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
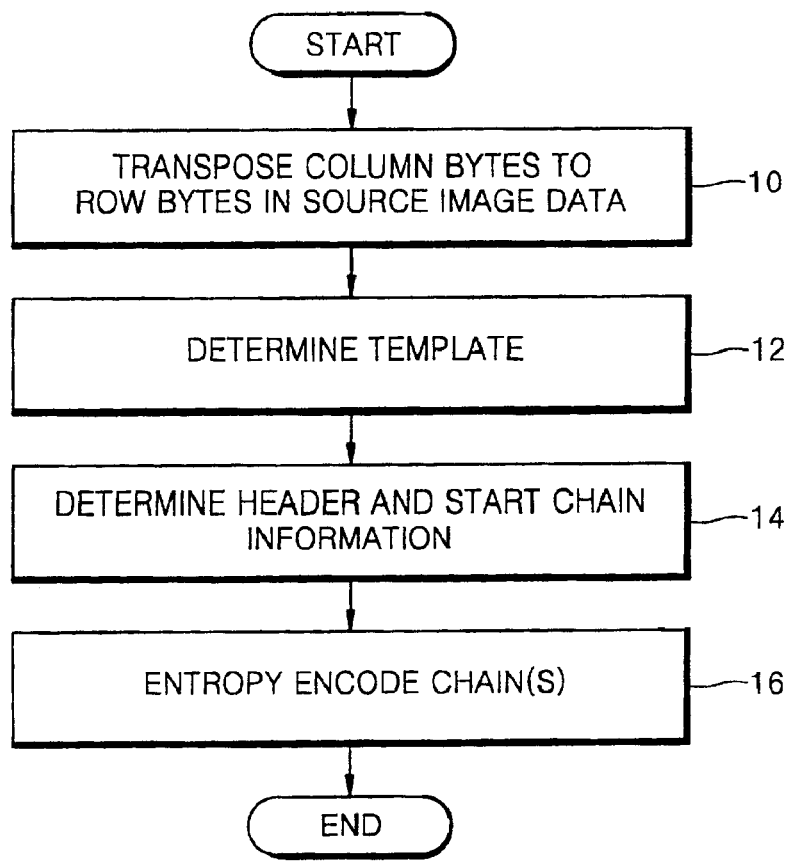
FIG. 1 is a flowchart illustrating a data compression method for a hard copy device, in accordance with the principles of the present invention.
Figure 2:
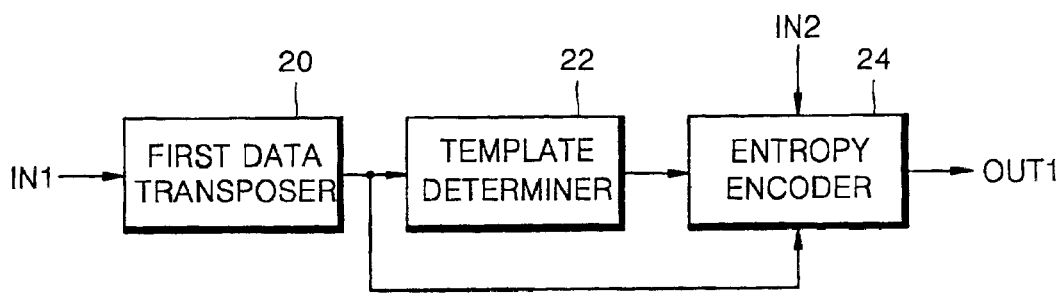
FIG. 2 is a block diagram illustrating a data compression apparatus for performing the data compression method of FIG. 1, in accordance with the principles of the present invention.

Hereinafter, a data compression method and apparatus for a hard copy device according to the present invention will be described in detail with reference to the attached drawings. FIG. 1 is a flowchart illustrating a data compression method for a hard copy device according to the present invention. The data compression method includes pre-processing steps 10 through 14 before encoding a corresponding chain and step 16 of entropy encoding the pre-processed chain. FIG. 2 is a block diagram illustrating a data compression apparatus for performing the data compression method of FIG. 1. The data compression apparatus includes a first data transposer 20, a template determiner 22 and an entropy encoder 24. FIG. 3 is a diagram illustrating a pattern in which the bytes of source image data are stored in a memory before transposition. Here, the source image data is composed of p×q bytes. FIG. 4 is a diagram illustrating a pattern in which the bytes of source image data are stored in a memory after transposition. Here, the source image data is composed of p×q bytes.

In step 10, the first data transposer 20 of FIG. 2 transposes the column bytes [1,1], [2,1], . . . in cells 30, 32, . . . at a predetermined number of columns in source image data of FIG. 3, which is input through an input terminal IN1, to the row bytes [1,1], [2,1], . . . in cells 40, 42, . . . at the predetermined number of rows as shown in FIG. 4, and outputs the transposed result of FIG. to the template determiner 22 and the entropy encoder 24. Here, the source image data input through the input terminal IN1 is used for hard copying a bilevel screened (or halftoned) image, can be generated by a personal computer or the like, as will be described later, and is stored in a memory in byte unit.

In FIG. 3, the neighboring row bytes, for example, [1,1] and [1,2] in the cells 30 and 34 among the row bytes [1,1], [1,2], . . . [1,q] in the cells 30, 34, . . . 38 at a row have neighboring memory addresses, and the distance, or the offset, between the neighboring column bytes, for example, [1,1] and [2,1] in the cells 30 and 32 among the [1,1], [2,1], . . . [p,1] in the cells 30, 32, . . . 36 at a column is very big. Here, the offset indicates a row width of a source image data bitmap and the distance between the two bytes in the memory. As the offset increases, addressing takes longer time.

Transposition is performed in step 10 before encoding the source image data because of the following two reasons. First, when an image is screened by way of bilevel (by a halftone-machine), a source image is more randomized. Therefore, it is not necessary to randomize a transposed image. Second, the geometrical distance between neighboring bytes in FIG. 3 is 8 pixels in a horizontal direction and 1 pixel in a vertical direction, so vertically neighboring bytes are more similar than horizontally neighboring bytes. For example, the neighboring column bytes [1,1] and [2,1] in the cells 30 and 32 at a column in FIG. 3 are more similar than the neighboring row bytes [1,1] and [1,2] in the cells 30 and 34 at a row. Nevertheless, it takes longer to address the neighboring bytes [1,1] and [2,1] in the cells 30 and 32 at the column than to address the neighboring bytes [1,1] and [1,2] in the cells 30 and 34 at the row. Accordingly, the step 10 is performed so that the neighboring bytes [1,1] and [2,1] in the cells 30 and 32 at the column are positioned at memory addresses neighboring in the horizontal direction, as shown in FIG. 4. In other words, since the offset between the neighboring bytes [1,1 ] and [2,1] in the cells 30 and 32 at the column is larger than that of the neighboring bytes [1,1 ] and [1,2] in the cells 30 and 34 at the row, the step 10 is performed such that the bytes at the column are transposed to the bytes at the row to reduce the offset between the neighboring bytes [1,1] and [2,1] in the cells 30 and 32 at the column, thereby reducing the time necessary for addressing the neighboring column bytes.

After the step 10, in step 12, the template determiner 22 of FIG. 2 receives the transposed result of FIG. 4 output from the first data transposer 20 and determines a template composed of previously compressed and processed chains referred to as "previous chains", which have similar values to or the same values as a current chain which is currently compressed and processed, and outputs the determined template to the entropy encoder 24. In the present invention, the term "chain" indicates data composed of at least two consecutive bytes, which will be described later. In an embodiment of the present invention, a chain may be composed of two bytes at a row, for example, the bytes [1,1] and [2,1] in the cells 40 and 42, or four bytes at the row, for example, [1,1], [2,1], . . . in the cells 40, 42, . . . in FIG. 4. Here, the term "template" indicates a specific pattern of the surround used for finding chains corresponding to a current chain among the previous chains. Here, the term "surround" indicates a set of all previous chains which have been compressed before the current chain is compressed and processed, and this will be described later.

Figures 5, 6, 7:
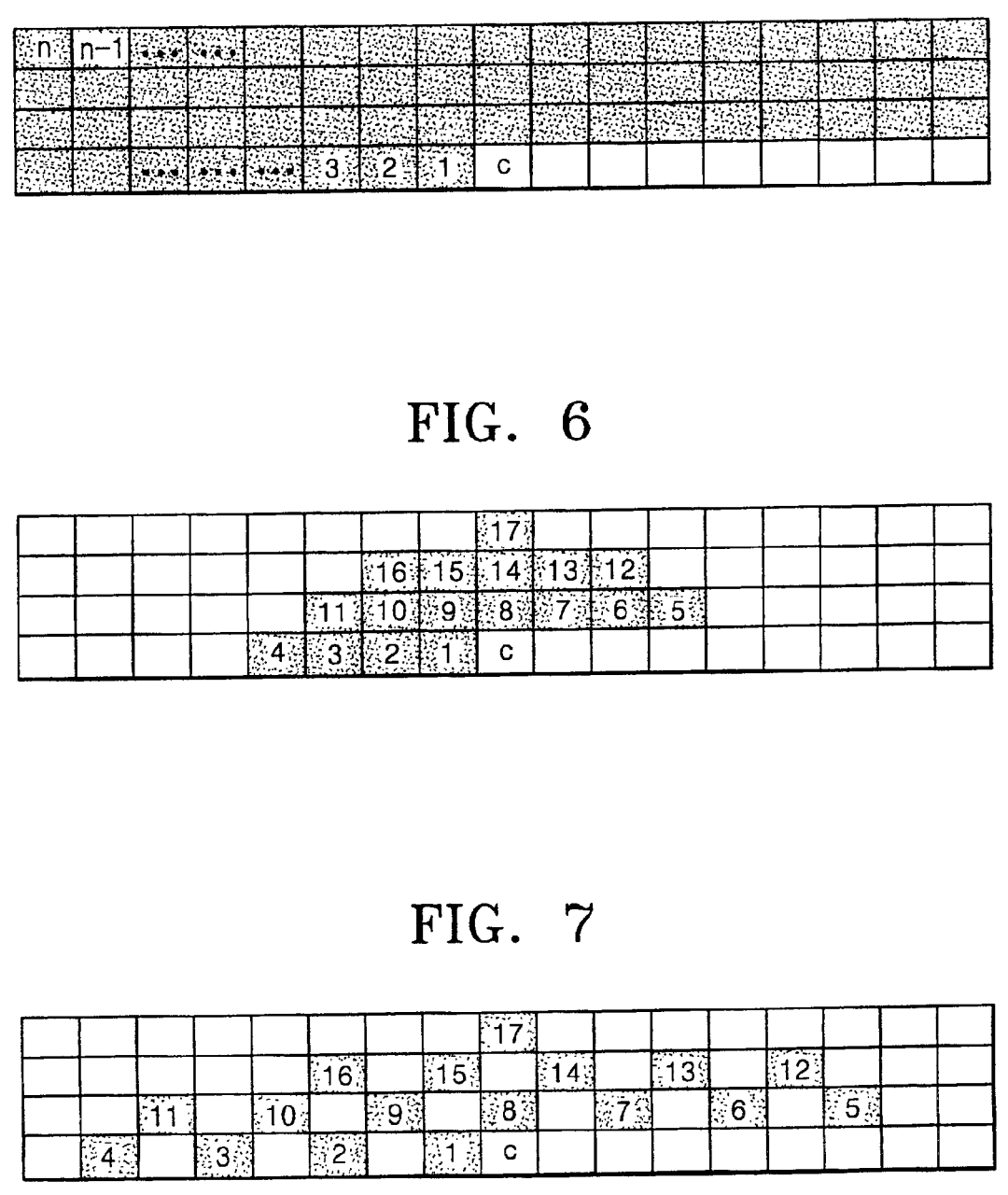

The step 12 of determining a template according to the embodiment of the present invention will be described with reference to the attached drawings. FIG. 5 is a diagram illustrating a pattern in which chains are stored in a memory. A shaded area composed of previous chains 1, 2, 3 . . . n−1 and n are a surround, and c indicates a current chain. FIGS. 6 and 7 are diagrams illustrating examples of a template having a length 17.

In FIG. 5, each cell indicates a chain, and the shaded area indicates a surround. Here, the surround is searched for a template, which is composed of chains having similar values to or the same values as that of the current chain c among the previous chains 1, 2, 3, . . . n−1 and n. Since the surround may be very large, it is necessary to obtain a template, whose size is smaller than the surround, in order to reduce compression time. For example, the surround of FIG. 5 can be reduced to templates having smaller sizes, as shown in FIGS. 6 and 7.

Figure 8:
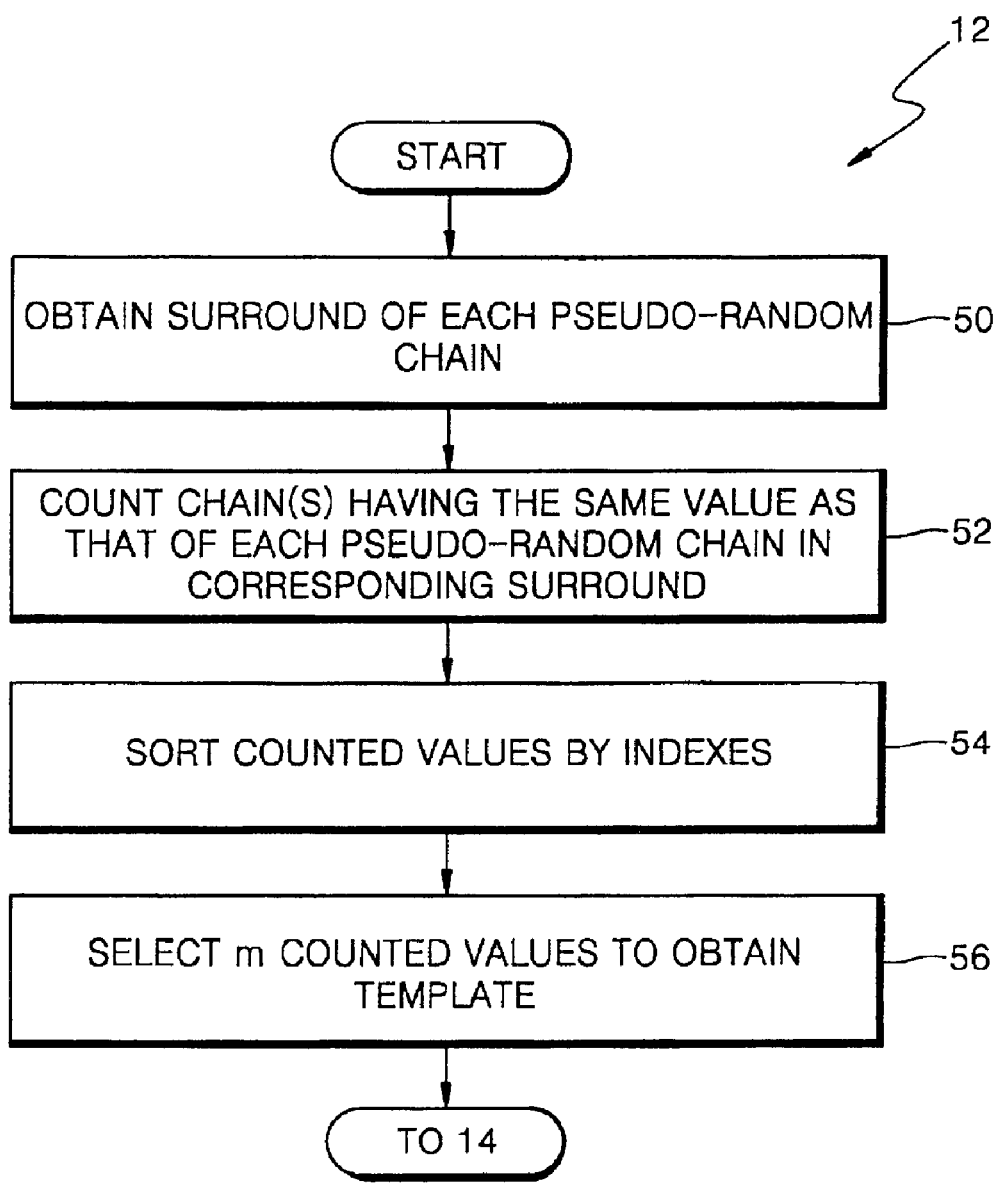
FIG. 8 is a flowchart illustrating a procedure of determining a template, in accordance with the principles of the present invention.
Figures 9, 10:
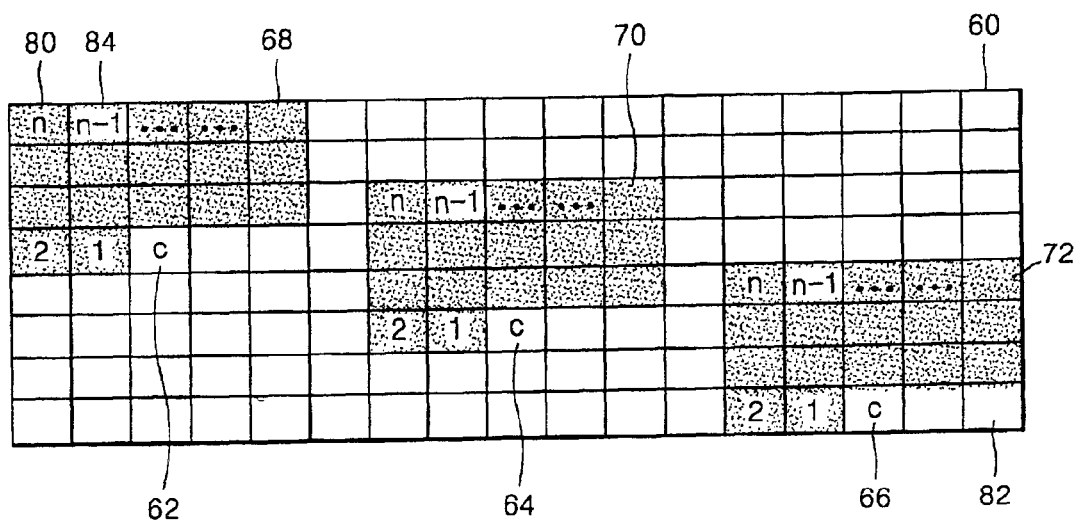
FIG. 9 is a diagram illustrating source image data stored in a memory in byte unit.
FIG. 10 is a diagram illustrating an example of a template determined by the template determination procedure.

FIG. 8 is a flowchart illustrating the step 12 of determining a template according to the present invention. The step 12 includes sub steps 50 through 56 of determining a template using a surround obtained for each pseudo-random chain. FIG. 9 is a diagram illustrating source image data stored in a memory 60 in byte unit. Each cell indicates a chain, and shaded areas indicate surrounds 68, 70 and 72. FIG. 10 is a diagram illustrating an example of a template determined by the template determination step 12 of FIG. 8. A shaded area indicates the example of a template composed of m chains 1, 2, . . . m−2, m−1 and m for a current chain c.

In step 50, the template determiner 22 obtains the possible surrounds 68, 70 and 72 of respective pseudo-random chains 62, 64 and 66 applied to source image data, which is stored in the memory 60 of FIG. 9 and obtained after the transposing step 10. For example, to obtain the template of the current chain c of FIG. 10, some pseudo-random chains 62, 64 and 66 of FIG. 9 are tested. Here, Each of the surrounds 68, 70 and 72 is composed of the previous chains 1, 2, . . . n−1 and n, which have been processed before the corresponding pseudo-random chain 62, 64 or is processed, and has a size n.

After the step 50, in step 52, a chain or chains which have the same value as that of the pseudo-random chain 62, 64 or 66 in the corresponding surround 68, 70 or 72 are counted. For example, among the chains 1, 2, . . . , n−1 and n in the surround 68, a chain or chains which have the same value as that of the pseudo-random chain 62 are counted. Among the chains 1, 2, . . . , n−1 and n in the surround 70, a chain or chains which have the same value as that of the pseudo-random chain 64 are counted. Among the chains 1, 2, . . . , n−1 and n in the surround 72, a chain or chains which have the same value as that of the pseudo-random chain 66 are counted. As described above, counting is repeated for the respective pseudo-random chains 62, 64 and 66.

In step 54, the counted values obtained in the step 52 are sorted by indexes, e.g., −1, −2, . . . −62 and −63, indicating the chains 1, 2, . . . n−1 and n in each of the surrounds 68, 70 and 72.

In step 56, a predetermined number m (m≦n, where m is the length of a template and is predetermined) of the counted values are selected starting from a maximum value among the sorted counted values. In other words, indexes having more number of the same values for all the pseudo-random chains 62, 64 and 66 are selected. As a result, for example, as shown in FIG. 10, a template T[1, 2, 3, . . . m] composed of chains 1, 2, . . . m−2, m−1 and m indicated by the indexes corresponding to the counted values selected in the step 56 is finally determined. Here, T[ ] indicates an array of m integers, and each integer 1, 2, 3 . . . or m within [ ] defines an offset. For example, when c is the index of a current chain, the index I of a chain indicated by a random i (1≦i≦m) existing in a template can be calculated by Equation (1).

$$I = c - T[i] \quad (1)$$

Here, T[i] indicates the distance between the chain indicated by the random i included in the template and the current chain c. Then, a chain, which is first addressed at any current row of the transposed source image data 60, can be included in the surround including a chain which is last addressed at the previous row.

In this embodiment, only three pseudo-random chains 62, 64 and 66 are used to determine a template in the transposed source image data stored in the memory 60 of FIG. 9. However, the number of pseudo-random chains is not restricted to three, and more pseudo-random chains can be used.

Thereafter, in step 14, start information k having information on a chain, which compression is performed starting from, and header information are determined. There are two methods of determining the start information k.

First, the start information k can be determined as that it has information on a chain which compression is performed starting from among the chains of the template. Here, the chain which compression is performed starting from should have a history. The term "history" means the array of a chain or chains which are compressed before the chain indicated by the start information k. For example, when it is assumed that compression is performed on the transposed source image data of FIG. 9 starting from the chain 80 to the chain 82 to the right and downward, the chain 80 cannot be the chain indicated by the start information k because the chain 80 does not have a history. In other words, assuming the start information k has a value of at least one, the start information k on the chain 80 is set to 0. That is, compression can be performed on the transposed source image data starting from any chain other than the first chain 80. Here, when the start information k is 1, in step 14 according to a data compression method of the present invention, it is determined whether the random i-th chain of the template is valid, and the i-th chain is removed from the template when it is determined that the i-th chain is not valid. Here, when the index I of the i-th chain expressed by Equation (1) is not negative, it is determined that the i-th chain is valid.

Second, the start information k can be determined as that it has information on a chain having a maximum T[i] among the chains of the template. In this case, it is not necessary to determine whether the random i-th chain of the template is valid in step 14.

Thereafter, in step 16, the entropy encoder 24 of FIG. 2 receives the current chain c from the first data transposer 20 and a dictionary from the template determiner 22, which can be a dictionary determiner (not shown), in response to the start information k input through an input terminal IN2, inspects the dictionary to determine whether the dictionary has any chain having the same value as that of the current chain c, entropy encodes sequential chains or the current chain c in response to the result of inspection, synthesizes the results of the entropy encoding to generate compressed source image data and outputs the compressed source image data through an output terminal OUT1. Here, the sequential chains designates the current chain c and a chain or chains succeeding the current chain c. A general entropy encoding method includes a dictionary method and a Hoffman method. The entropy encoding method according to the present invention described above is performed by the dictionary method.

Here, the dictionary is composed of chains which have been compressed before a current chain is compressed and corresponds to a surround or a template. When the dictionary corresponds to a template, a data compression method according to the embodiment of the present invention is performed as shown in FIG. 1, and a data compression apparatus according to the embodiment of the present invention is configured as shown in FIG. 2. However, when the dictionary corresponds to a surround, the template determining step 12 is omitted from the data compression method of FIG. 1 so that the step 14 is performed after the step 10, and the template determiner 22 of FIG. 2 is replaced by a surround determiner (not shown). It will be apparent that the surround determiner determines the surround of a current chain.

Hereinafter, for the clarity of a description, data compression and reconstruction methods and apparatuses according to the present invention will be described on the assumption that the dictionary is a template. The entropy encoder 24 inspects a template input from the template determiner 22 to determine whether a current chain input from the first data transposer exists in the template, entropy encodes corresponding chains in response to the result of the inspection and outputs the entropy encoded result through the output terminal OUT1.

Figure 11:
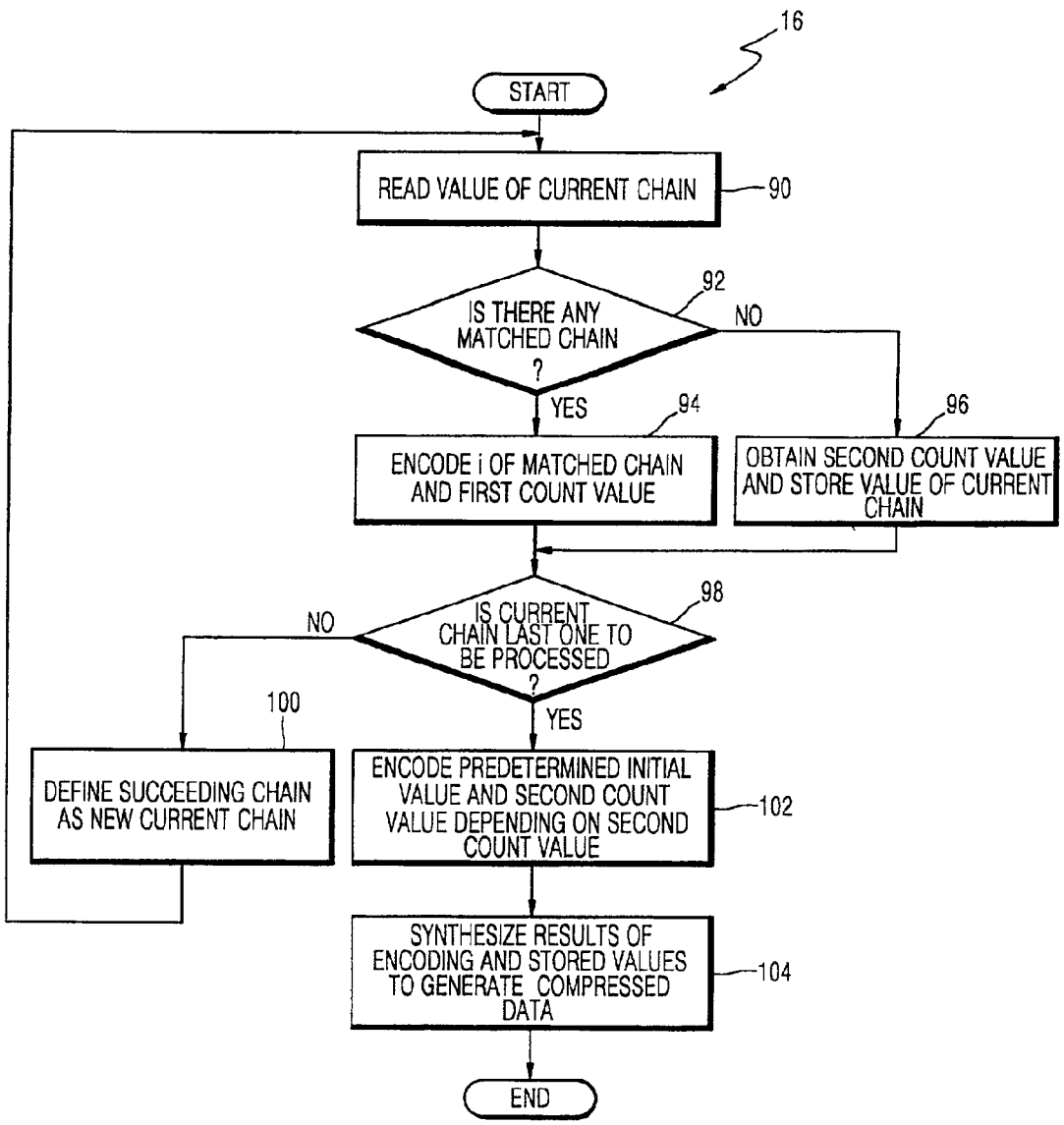
FIG. 11 is a flowchart of an entropy encoding procedure, in accordance with the principles of the present invention.
Figure 12:
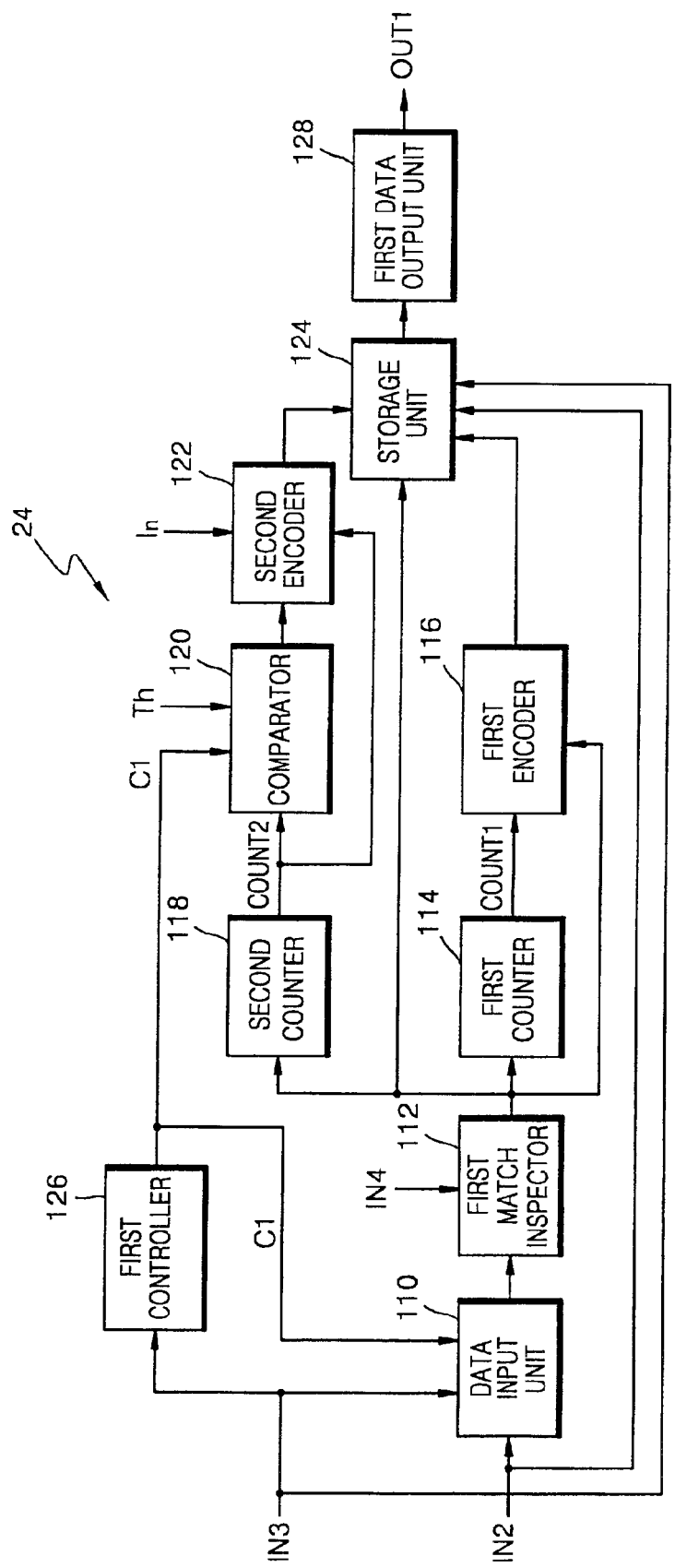
FIG. 12 is a block diagram illustrating an entropy encoder, in accordance with the principles of the present invention.

The entropy encoding step 16 performed by the entropy encoder 24 of FIG. 2 according to the embodiment of the present invention will be described with reference to the attached drawings. FIG. 11 is a flowchart according to the present invention, illustrating the entropy encoding step 16 including the sub steps 90 through 104 of differently encoding a current chain depending on whether the current chain has a matched chain. FIG. 12 is a block diagram illustrating the entropy encoder 24 according to the embodiment of the present invention. The entropy encoder 24 includes a data input unit 110, a first match inspector 112, a first counter 114, a first encoder 116, a second counter 118, a comparator 120, a second encoder 122, a storage unit 124, a first controller 126 and a first data output unit 128.

In step 90, the data input unit 110 of FIG. 12 reads the value of the current chain input through an input terminal IN3 from the first data transposer 20 in response to the start information and the header information input through the input terminal IN2 and a first control signal C1 input from the first controller 126, and outputs the read value of the current chain to the first match inspector 112.

In step 92, the first match inspector 112 determines whether a matched chain having the same value as that of the current chain read by the data input unit 110 exists in the template input through an input terminal IN4 from the template determiner 22. Here, the first match inspector 112 detects a first match signal indicating the existence/nonexistence of a matched chain and the index i of a matched chain from the result of the determination. The first match inspector 112 outputs the first match signal to the storage unit 124 and the first and second counters 114 and 118 and outputs the index i to the first encoder 116.

If any matched chain exists in the template, in step 94, the index i of a first matched chain and a first count value COUNT1, which is the result of counting the number of sequential current chains having a matched chain, are encoded. For this operation, once recognizing that any matched chain exists in the template by the first match signal from the first match inspector 112, the first counter 114 counts the number of sequential current chains having a matched chain and outputs the result of the counting, i.e., the first count value COUNT1, to the first encoder 116. The first encoder 116 encodes the first count value COUNT1 and the index i of a matched chain and outputs the result of the encoding to the storage unit 124. Also, the first counter 114 may count the number of sequential chains having the same value to obtain the first count value COUNT1, and the first count value COUNT1 can be encoded according to a Run Length Coding (RLC) method. In RLC, only the number of chains in succession and information on a chain at the beginning of the succession are encoded.

Alternatively, if it is determined that a matched chain does not exist in the template, in step 96, among the chain to be processed, the number of sequential chains not having a matched chain in the template is counted to obtain a second count value COUNT2, and the value of the current chain is stored. For this operation, once recognizing that no matched chain exists in the template by the first match signal, the second counter 118 counts the number of sequential chains not having a matched chain in the template and outputs the result of the counting, i.e., the second count value COUNT2, to the comparator 120 and the second encoder 122. The current chain input through the input terminal IN3 is output to the storage unit 124.

After the step 94 or 96, in step 98, the first controller 126 determines whether the current chain input through the input terminal IN3 from the first data transposer 20 is the last one to be processed in the transposed source image data, for example, whether the current chain is the chain 82 in FIG. 9, and outputs the result of the determination as the first control signal C1 to the data input unit 110 and the comparator 120.

If the current chain is not the last one, in step 100, a chain succeeding the current chain is defined as a new current chain, and then the step 90 is performed. For this operation, once recognizing that the current chain input through the input terminal IN3 is not the last one by the first control signal C1 from the first controller 126, the data input unit 110 receives a chain succeeding the current chain as a new current chain through the input terminal IN3.

If the current chain is the last one to be processed, in step 102, a predetermined initial value and the second count value COUNT2 are encoded depending on the second count value COUNT2. For this operation, once recognizing that the current chain is the last one by the first control signal C1 from the first controller 126, the comparator 120 compares the second count value COUNT2 with a predetermined threshold value Th, for example, zero and outputs the result of the comparison to the second encoder 122. The second encoder 122 encodes the second count value COUNT2 and the predetermined initial value In input from the outside in response to the result of the comparison of the comparator 120 and outputs the result of the encoding to the storage unit 124.

In response to the first match signal from the first match inspector 112, the storage unit 124 stores the results from the first and second encoders 116 and 122, the value of the current chain input through the input terminal IN3 from the first data transposer 20 and the start information k input through the input terminal IN2. For this operation, the storage unit 124 may be composed of first and second storage units (not shown). The first storage unit stores the encoded result from the first encoder 116 or the encoded result from the second encoder 122 as chunk data, which will be described later, in response to the first match signal. The second storage unit stores the value of the current chain and the start information k as chain data, which will be described later, in response to the first match signal.

Thereafter, in step 104, the first data output unit 128 synthesizes the start information, the value of the current chain and the encoded results from the first and second encoders 116 and 122, which are received from the storage unit 124, and outputs the synthesized result as compressed source image data through the output terminal OUT1.

Figure 13:
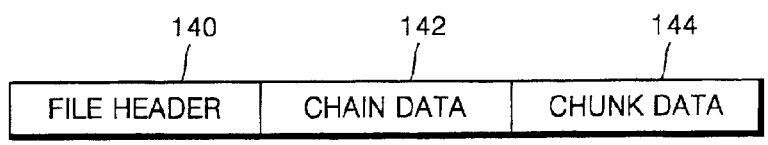
FIG. 13 is a diagram illustrating the format of compressed source image data, in accordance with the principles of the present invention.

The format of source image data, which is compressed by the data compression method and apparatus for a hard copy device according to the embodiment of the present invention shown in FIGS. 1 and 2, will be described with reference to the attached drawings. FIG. 13 is a diagram illustrating the format of compressed source image data according to the embodiment of the present invention. The compressed source image data includes a file header 140, chain data 142 and chunk data 144.

Generally, most computers have better performance when processing 4-byte aligned data in units of 32 bits and when processing 2-byte aligned data in units of 16 bits. For this reason, chunk data and chain data are separated in source image data compressed according to the present invention, as shown in FIG. 13. The chunk data 144 is one-byte aligned data, but the chain data 142 may be 4-byte or 2-byte aligned data. Here, only the chain data is subjected to the alignment, but the chunk data is not subjected to the alignment.

The chunk data 144 of FIG. 13 includes the results of the encoding operation of the first and second encoders 116 and 122 and is one-byte aligned data. After entropy encoding, the chunk data 144 is merged in step 104. Here, the one-byte aligned data means the data unaligned. Since the chunk data 144 is composed of data of different sizes, it is not aligned. That is, the chunk data 144 is never aligned.

Figure 14:
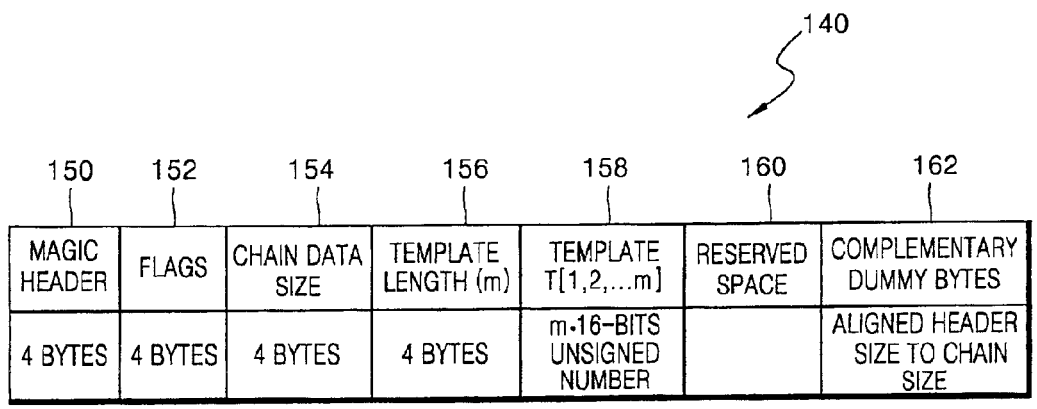
FIG. 14 is a diagram illustrating the data format of a file header, in accordance with the principles of the present invention.

FIG. 14 is a diagram illustrating the data format of the file header 140 of FIG. 13 according to the embodiment of the present invention. The file header 140 includes a magic header 150, flags 152, a chain data size 154, a template length (m) 156, a template (T[1,2, . . . ,m]) 158, a reserved space 160 and complementary dummy bytes 162.

The file header 140 of FIG. 13 has a fixed format. The file header 140 corresponds to the header described in the step 14 and can be embodied as shown in FIG. 14. Because the chain data size 154 of the file header 140 of FIG. 14 depends on the characteristics of a system including a data compression apparatus and a data reconstruction apparatus according to the present invention, it is very important not to fix the value written to the chain data size 154 in the file header 140. Particularly, the chain data size 154 should be considered when data compression and reconstruction apparatuses are designed. For example, the whole size of source image data should be exactly the same as the value written in chain data size 154. The reserved space 160 of FIG. 14 may include the width and height of an image. However, the width and height of an image are usually predetermined, so it is not necessary to essentially consider them when a data compression apparatus is designed.

Figure 15:
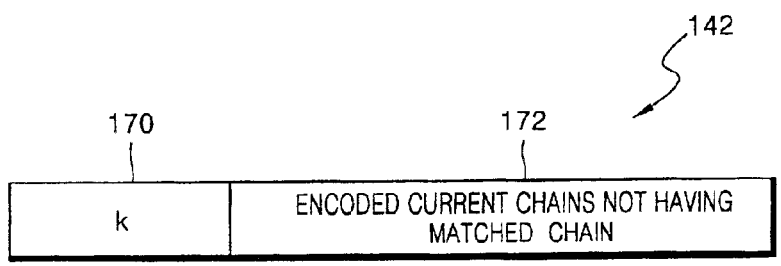
FIG. 15 is a diagram illustrating the format of chain data, in accordance with the principles of the present invention.

FIG. 15 is a diagram illustrating the format of the chain data 142 of FIG. 13 according to the embodiment of the present invention. The chain data 142 includes start information (k) and encoded current chains 172 not having a matched chain.

The origin of the chain data 142 of FIG. 13 is immediately after the end of the file header 140 and can be embodied as shown in FIG. 15. The start information 170 of the chain data of FIG. 15 has information on a chain which compression is performed starting from. Here, information k on a chain which compression is performed starting from is not encoded but is stored as it is in the start information 170. As described in the step 96, information on a current chain not having a matched chain is stored in the predetermined portion 172 of FIG. 15 without being encoded.

FIGS. 16A and 16B are diagrams illustrating the formats of the chunk data 144 of FIG. according to the present invention. It is assumed that data shown in FIG. 16A is a first byte and data shown in FIG. 16B is a second byte. The second byte is optional.

The first count value COUNT1 (or the second count value COUNT2) and the index i (or the predetermined initial value) of a matched chain can be stored together in the first byte of FIG. 16A. The first count value COUNT1 (or the second count value COUNT2) may be stored in the second byte of FIG. 16B as well as the first byte of FIG. 16A. The index i (or the predetermined initial value) of a matched chain is always stored in M ($m=2^M-1$) bits of the first byte of FIG. 16A, and the first count value COUNT1 (or the second count value COUNT2) is stored in the remaining 8-M bits of the first byte. For example, the predetermined initial value may be stored as M zero bits in the first byte. When a value stored in the 8-M bits of the first byte is zero, the first count value COUNT1 (or the second count value COUNT2) actually exceeds a maximum count value $2^{8-M}-1$ which can be stored in 8-M bits since the first count value COUNT1 (or the second count value COUNT2) cannot be zero. Here, the second byte as well as the 8-M bits of the first byte is used for storing the first count value COUNT1 (or the second count value COUNT2). Here, according to the present invention, M may be 3, 4, 5 or 6 (m=7, 15, 31 or 63).

Hereinafter, how the chunk data 144 is differently stored depending on the value of m will be described with reference to the attached drawings. FIG. 17 is a diagram illustrating the format of one byte of the chunk data 144 when m=7. The index i of a matched chain, which has one value among the values 0 through 7, or the predetermined initial value which can be expressed by, for example, i=0, is stored in three bits 0, 1 and 2, and the first count value COUNT1 (or the second count value COUNT2) is stored in the remaining five bits 3, 4, 5, 6 and 7, among the eight bits 0 through 7 of FIG. 17.

FIGS. 18A and 18B are diagrams illustrating the format of one byte or two bytes of the chunk data when m=15. The index i of a random matched chain, which has one value among the values 0 through 15, or the predetermined initial value which can be expressed by, for example, i=0, is stored in four bits 0, 1, 2 and 3, and the first count value COUNT1 (or the second count value COUNT2) is stored in the remaining four bits 4, 5, 6 and 7, among the eight bits 0 through 7 of FIG. 18A. When the first count value COUNT1 (or the second count value COUNT2) exceeds 15, the count value is stored in the remaining four bits of the first byte and the second byte of FIG. 18B. A maximum storable first count value COUNT1 (or the second count value COUNT2) is 271, and 272 kinds (0 through 271) of first count value COUNT1 (or the second count value COUNT2) can be stored.

FIGS. 19A and 19B are diagrams illustrating the format of one or two bytes of the chunk data 144 when m=31. The index i of a random matched chain, which has one value among the values 0 through 31, or the predetermined initial value which can be expressed by, for example, i=0, is stored in five bits 0, 1, 2, 3 and 4, and the first count value COUNT1 (or the second count value COUNT2) is stored in the remaining three bits 5, 6 and 7, among the eight bits 0 through 7 of FIG. 19A. When the first count value COUNT1 (or the second count value COUNT2) exceeds 7, the count value is stored in the remaining three bits of the first byte and the second byte of FIG. 19B. A maximum storable first count value COUNT1 (or the second count value COUNT2) is 263, and 264 kinds (0 through 263) of first count value COUNT1 (or the second count value COUNT2) can be stored.

Figures 20A, 20B, 21:
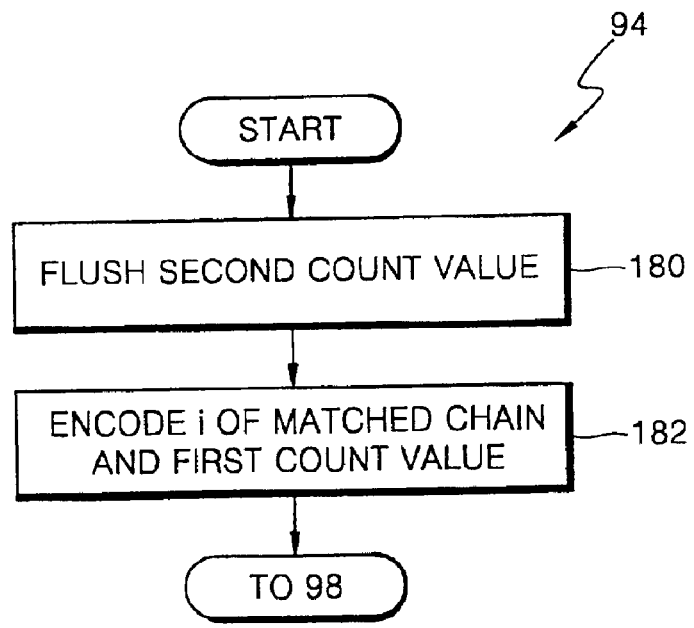
FIGS. 20A and 20B are diagrams illustrating the formats of chunk data when m=63.
FIG. 21 is a flowchart illustrating the step 94 of FIG. 11, in accordance with the principles of the present invention.

FIGS. 20A and 20B are diagrams illustrating the format of one or two bytes of the chunk data 144 when m=63. The index i of a random matched chain, which has one value among the values 0 through 63, or the predetermined initial value which can be expressed by, for example, i=0, is stored in six bits 0, 1, 2, 3, 4 and 5, and the first count value COUNT1 (or the second count value COUNT2) is stored in the remaining two bits 6 and 7, among the eight bits 0 through 7 of FIG. 20A. When the first count value COUNT1 (or the second count value COUNT2) exceeds 3, the count value is stored in the remaining two bits of the first byte and the second byte of FIG. 20A. A maximum storable first count value COUNT1 (or the second count value COUNT2) is 259, and 260 kinds (0 through 259) of first count value COUNT1 (or the second count value COUNT2) can be stored.

The following description concerns the embodiments of the steps 94, 96 and 102 of FIG. 11 according to the present invention. The embodiments of the steps 94, 96 and 102 are not necessarily performed by the data compression apparatus of FIG. 12. The facts described above are applied to the following embodiments. For example, the data compression apparatus of FIG. 12 includes the first and second counters 114 and 118, but only one counter may be used for performing the following sub steps.

FIG. 21 is a flowchart illustrating the step 94 of FIG. 11 according to the embodiment of the present invention. The step 94 includes the sub steps 180 and 182 for flushing the second count value COUNT2 and encoding the index i of a matched chain and the first count value COUNT1. If it is determined that there is any matched chain in the template in the step 92, the second count value COUNT2 is flushed in step 180. Then, in step 182, the index i of the matched chain and the first count value COUNT1 are encoded, and the step 98 is performed.

Figure 22:
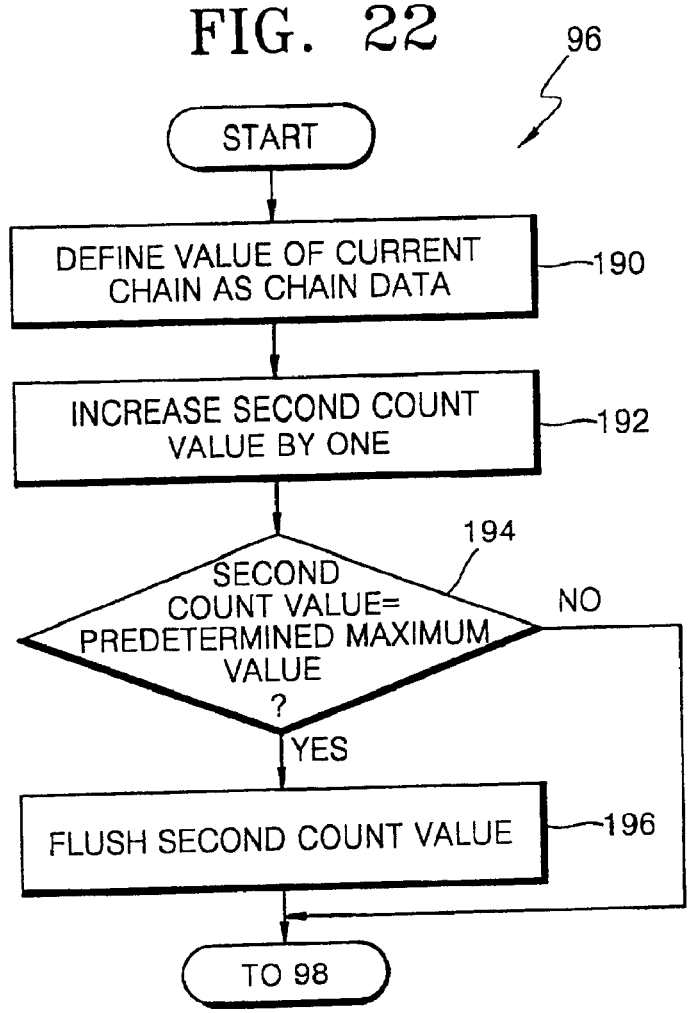
FIG. 22 is a flowchart illustrating the step 96 of FIG. 11, in accordance with the principles of the present invention.

FIG. 22 is a flowchart illustrating the step 96 of FIG. 11 according to the embodiment of the present invention. The step 96 includes the sub steps 190 through 196 for storing the value of the current chain and obtaining the second count value COUNT2. If it is determined that no matched chain exists in the template in the step 92, the value of the current chain is defined and stored as the chain data 142 of FIG. 13 in step 190. Thereafter, in step 192, the second count value COUNT2 is increased by one to count the number of current chains not having a matched chain, as described above. In step 194, it is determined whether the second count value COUNT2 is a predetermined maximum value. If the second count value COUNT2 is not the predetermined maximum value, the step 98 is performed. Alternatively, if the second count value COUNT2 is the predetermined maximum value, the second count value COUNT2 is flushed in step 196, and then the step 98 is performed.

Figure 23:
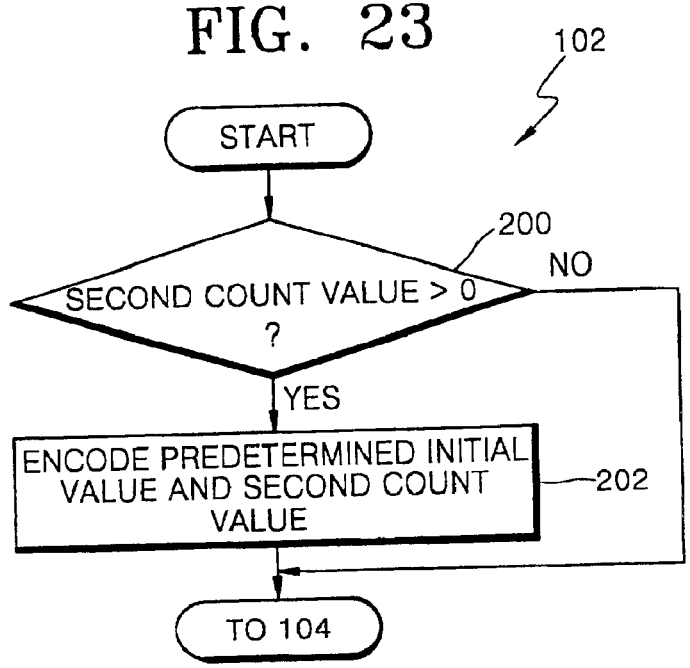
FIG. 23 is a flowchart illustrating the step 102 of FIG. 1, in accordance with the principles of the present invention.

FIG. 23 is a flowchart illustrating the step 102 of FIG. 11 according to the embodiment of the present invention. The step 102 includes the sub steps 200 and 202 for encoding the predetermined initial value and the second count value COUNT2 depending on the second count value COUNT2. If it is determined that the current chain is the last one to be processed in step 98, it is determined whether the second count value COUNT2 exceeds the predetermined threshold value Th, for example, zero, in step 200. If the second count value COUNT2 does not exceed zero, the step 104 is performed. Alternatively, if the second count value COUNT2 exceeds zero, the predetermined initial value and the second count value COUNT2 are encoded in step 202, and then the step 104 is performed.

Figures 24, 25A, 25B, 25C:
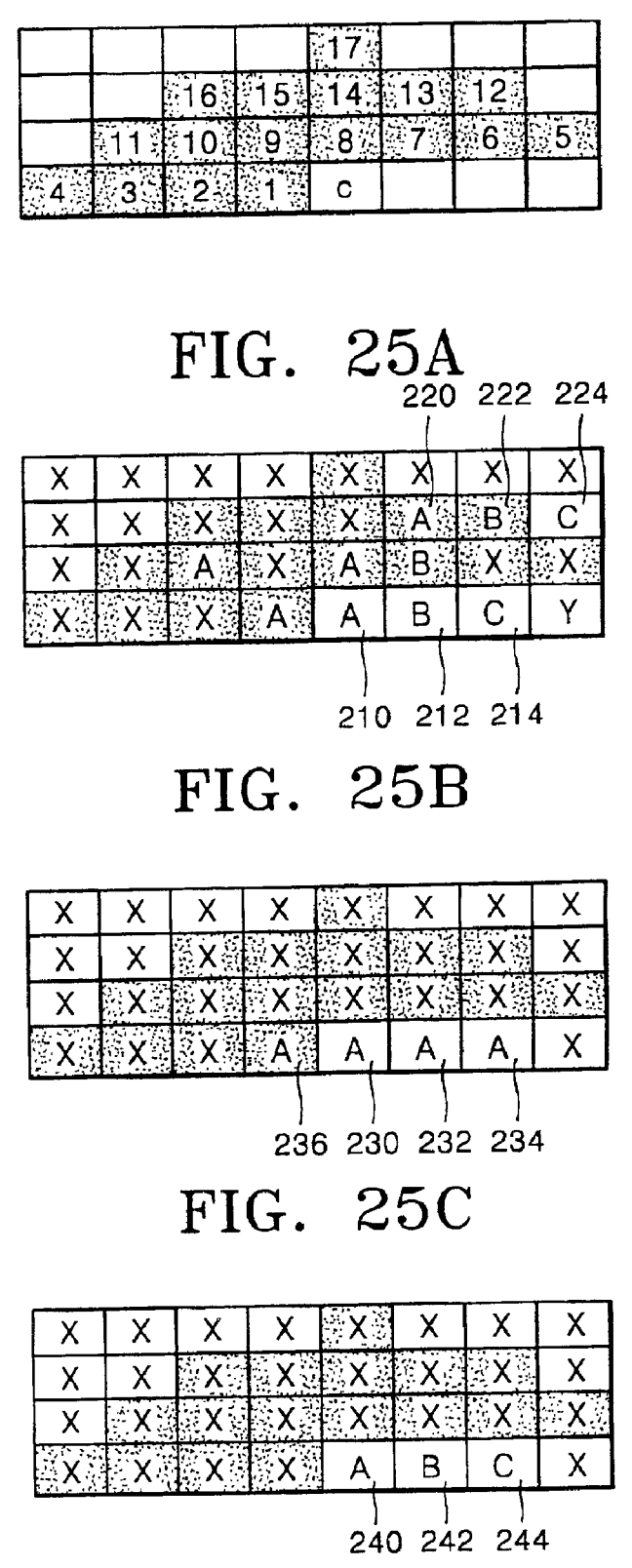

FIG. 24 is a diagram illustrating a pattern in which data is stored in a memory. The shaded area is the example of a template, and c denotes a current chain. FIGS. 25A through 25C are diagrams illustrating patterns in which data is stored in a memory. In each of FIGS. 25A through 25C, the possible values of the chains shown in FIG. 24 are shown, and a shaded area corresponds to the template of FIG. 24.

For the clarity of the description of the present invention, it is assumed that a template as shown in FIG. 24 is obtained by performing the step 12 of FIG. 1 and that the value which each chain 1, 2, 3 . . . , 16 or 17 of the template of FIG. 24 can have is, for example, A, B, C, X or Y, as shown in FIG. 25A, 25B or 25C. With reference to the drawings mentioned above, the entropy encoding step 16 of FIG. 1 according to the embodiment of the present invention will be described. Here, reference characters A, B, C, X and Y denote different data.

First, it is assumed that the chains of the template of FIG. 24 have values shown in FIG. 25A. The value A of a current chain (c) 210 to be compressed in FIG. 25A is read. It is determined whether any matched chain having the same value as the value A of the current chain 210 exists in the template of FIG. 25A. Here, matched chains exist, so the index i, i.e, 13, of a matched chain 220, from which a sequence of matched chains 220, 222 and 224 having the same values as the respective values A, B and C of the longest sequence of current chains 210, 212 and 214 starts, is found among the indexes i=1, 8, 10 and 13 of the matched chains existing in the template. Accordingly, the index i, 13, and the number COUNT1, i.e., 3, of the sequential current chains 210, 212 and 214 having matched chains are encoded as chain data. COUNT1 is 3 in this example, because A has at least one matched chain, B has at least one matched chain, C has at least one matched chain, and Y has not matched chains.

Second, it is assumed that the chains of the template of FIG. 24 have values shown in FIG. 25B. The value A of a current chain 230 to be compressed in FIG. 25B is read. It is determined whether any matched chain having the same value as the value A of the current chain 230 exists in the template of FIG. 25B. Here, a matched chain 236 exists, so the index i, i.e, 1, of the matched chain 236 in the template is found. In addition, the number of sequential current chains 230, 232 and 234 having the matched chain 236 in the template is counted to obtain the first count value COUNT1, i.e., 3. Accordingly, the index i, 1, and the first count value COUNT1, i.e., 3, are encoded as chain data. For example, the chains 236, 230, 232 and 234 having the same values in FIG. 25B are encoded according to a RLC method, as described above.

Third, it is assumed that the chains of the template of FIG. 24 have values shown in FIG. 25C. The value A of a current chain 240 to be compressed in FIG. 25C is read. It is determined whether any matched chain having the same value as the value A of the current chain 240 exists in the template of FIG. 25C. Here, no matched chain exists, so the second count value COUNT2, i.e., 3, which is the number of sequential current chains 240, 242 and 244 not having a matched chain, is encoded, and the encoded result is stored as chunk data. The values A, B and C of the sequential chains 240, 242 and 244 not having a matched chain are stored as chain data without being compressed. Here, the predetermined initial value can be stored as zero in the positions where i is stored in the first byte of the chunk data of FIG. 16A, 17, 18A, 19A or 20A.

Figure 26:
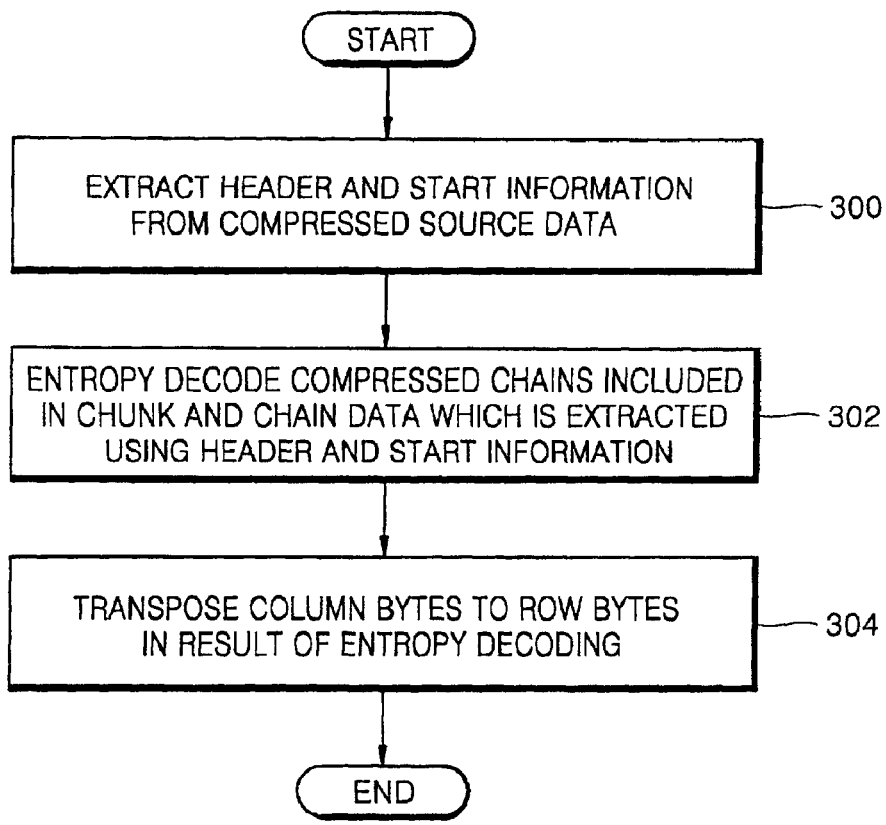
FIG. 26 is a flowchart illustrating a data reconstruction method for a hard copy device, in accordance with the principles of the present invention.
Figure 27:
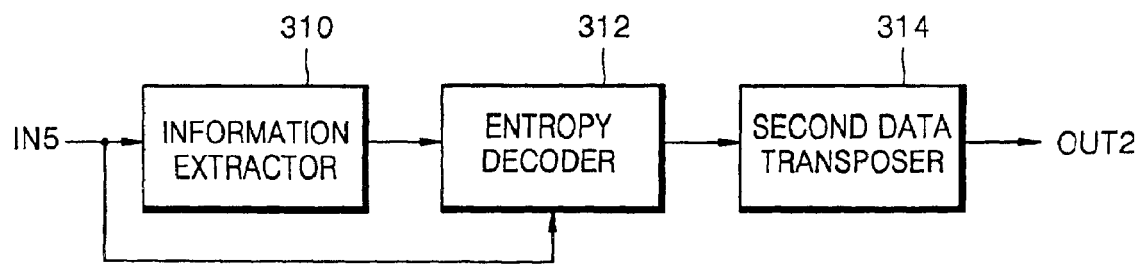
FIG. 27 is a block diagram illustrating a data reconstruction apparatus for performing a data reconstruction method, in accordance with the principles of the present invention.

Hereinafter, a data reconstruction method for a hard copy device and the configuration and operation of a reconstruction apparatus for performing the reconstruction method according to the present invention will be described with reference to the attached drawings. FIG. 26 is a flowchart illustrating a data reconstruction method for a hard copy device according to the present invention. The method includes the steps 300 and 302 for entropy decoding compressed chains included in chunk data and chain data, which is extracted from compressed source image data using header and start information extracted from the compressed source image data, and the step 304 of performing transposition on the result of the entropy decoding to reconstruct source image data. FIG. 27 is a block diagram illustrating a data reconstruction apparatus for performing the data reconstruction method of FIG. 26 according to the present invention. The data reconstruction apparatus includes an information extractor 310, an entropy decoder 312 and a second data transposer 314.

The method and apparatus of FIGS. 26 and 27 reconstruct original source image data from source image data compressed by a data compression method and apparatus according to the present invention described above. First, in step 300, the information extractor 310 extracts the header 140 of FIG. 13 and the start information 170 of FIG. 15 from compressed source image data input through an input terminal IN5 and outputs the extracted header 140 and the start information 170 to the entropy decoder 312.

In step 302, the entropy decoder 312 entropy decodes compressed chains included in the chunk data 144 and the chain data 142 of FIG. 13, which is extracted from the compressed source image data input through the input terminal IN5 in response to the header 140 and the start information 170, and outputs the result of the entropy decoding to the second data transposer 314. In other words, the step 302 reversely performs the entropy encoding step 16 of FIG. 11.

Figure 28:
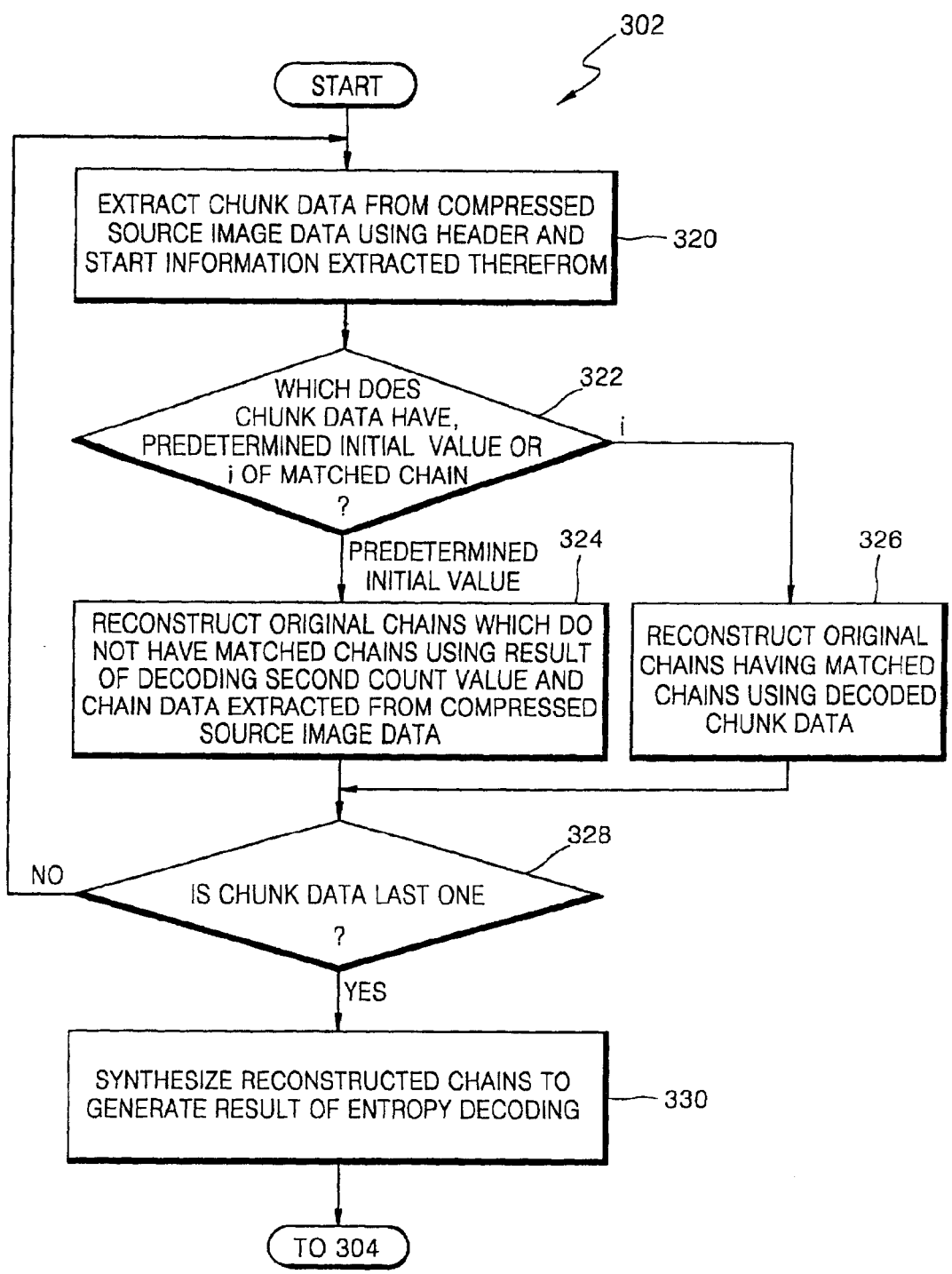
FIG. 28 is a flowchart illustrating the step 302 of FIG. 26, in accordance with the principles of the present invention.
Figure 29:
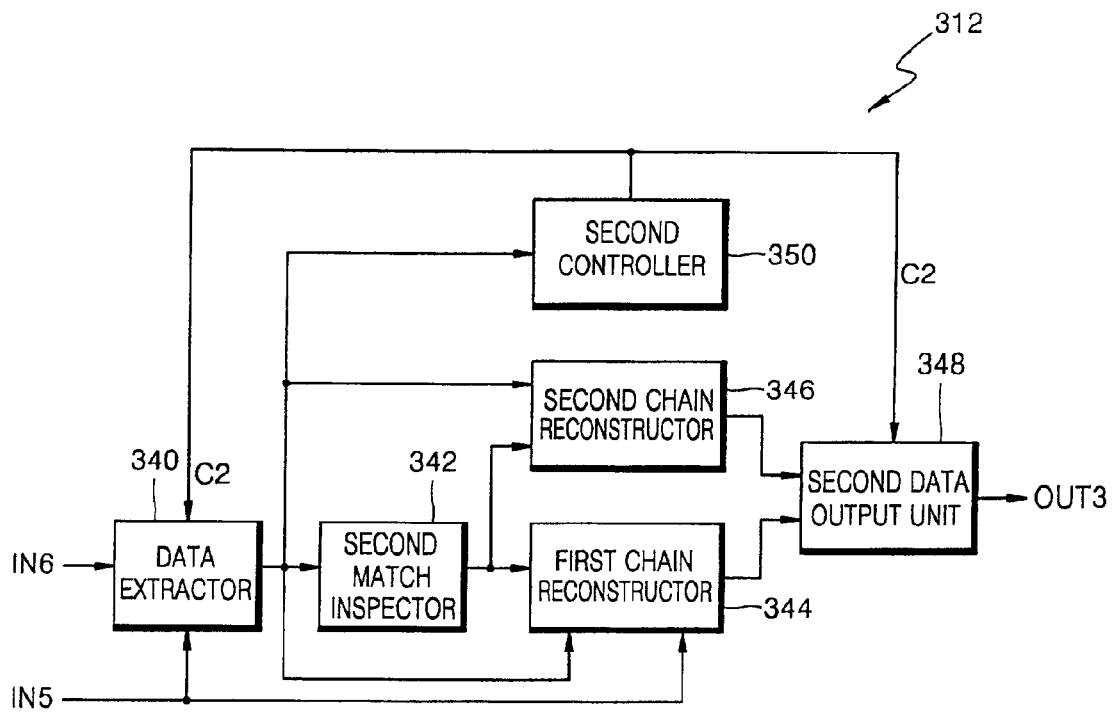
FIG. 29 is a block diagram illustrating the entropy decoder of FIG. 27, in accordance with the principles of the present invention.

The entropy decoding step 302 and the configuration and operation of the entropy decoder 312 according to the present invention will be described with reference to the attached drawings. FIG. 28 is a flowchart illustrating the step 302 of FIG. 26, according to the embodiment of the present invention. The embodiment of step 302 of FIG. 26 includes the sub steps 320 through 330 for differently reconstructing compressed chains depending on the values of all chunk data extracted and obtaining the result of entropy decoding. FIG. 29 is a block diagram illustrating the entropy decoder 312 of FIG. 27, according to the embodiment of the present invention. The entropy decoder 312 includes a data extractor 340, a second match inspector 342, first and second chain reconstructors 344 and 346, a second data output unit 348 and a second controller 350.

In step 320, the data extractor 340 extracts the chunk data 144 from the compressed source image data input through the input terminal IN5 in response to the header 140 and the start information 170 received from the information extractor 310 through an input terminal IN6 and a second control signal C2 received from the second controller 350, and outputs the extracted chunk data 144 to the second match inspector 342.

In step 322, the second match inspector 342 inspects the chunk data 144 to determine whether the chunk data 144 extracted by the data extractor 340 has a predetermined initial value or the index i of a matched chain, and outputs the result of the inspection as a second match signal to the first and second chain reconstructors 344 and 346.

If the chunk data has the predetermined initial value, for example, if i=0 in the first byte of the chunk data, in step 324, a second count value COUNT2 contained in the chunk data is decoded, and compressed chains which do not have matched chains are reconstructed using the result of the decoding and chain data extracted from the compressed source image data. For this operation, once recognizing based on the second match signal that the chunk data has the predetermined initial value, the first chain reconstructor 344 decodes the second count value COUNT2 contained in the chunk data output from the data extractor 340, reconstruct original chains, which do not have matched chains, using the result of the decoding and the chain data extracted from the compressed source image data received through the input terminal IN5, and outputs the reconstructed chains to the second data output unit 348. The step 324 reversely performs the step 96 of FIG. 11.

Alternatively, if the chunk data has the index i of a matched chain, for example, if i≠0 in the first byte of the chunk data, in step 326, the chunk data is decoded, and original chains having matched chains are reconstructed using the decoded chunk data. For this operation, once recognizing based on the second match signal that the chunk data has the index of a matched chain, the second reconstructor 346 decodes the chunk data received from the data extractor 340, reconstructs the chains having the matched chains using the decoded chunk data and outputs the reconstructed chains to the second data output unit 348. The step 326 reversely performs the step 94 of FIG. 11.

After the step 324 or 326, in step 328, the second controller 350 determines whether the chunk data received from the data extractor 340 is the last one and outputs the result of the determination to the data extractor 340 as a second control signal C2. Therefore, once recognizing based on the second control signal C2 that the chunk data is not the last one, the data extractor 340 extracts new chunk data from the compressed source image data input through the input terminal IN5. Therefore, the steps 320 through 326 are repeated. Alternatively, once recognizing based on the second control signal C2 that the chunk data is the last one, the data extractor 340 does not extract chunk data from the compressed source image data input through the input terminal IN5 any more. Then, once recognizing based on the second control signal C2 that the chunk data is the last one, the data output unit 348 synthesizes the reconstructed chains from the first and second chain reconstructors 344 and 346, and outputs the synthesized result as the result of entropy decoding to the second data transposer 314 through an output terminal OUT3, in step 330.

Thereafter, in step 304, the second data transposer 314 transposes bytes at a column to bytes at a row in the result output from the entropy decoder 312 and outputs the result of the transposition as reconstructed source image data through an output terminal OUT2. The step 304 is the same as the step 10 of FIG. 1, and thus a detailed description thereof will be omitted.

Figure 30:
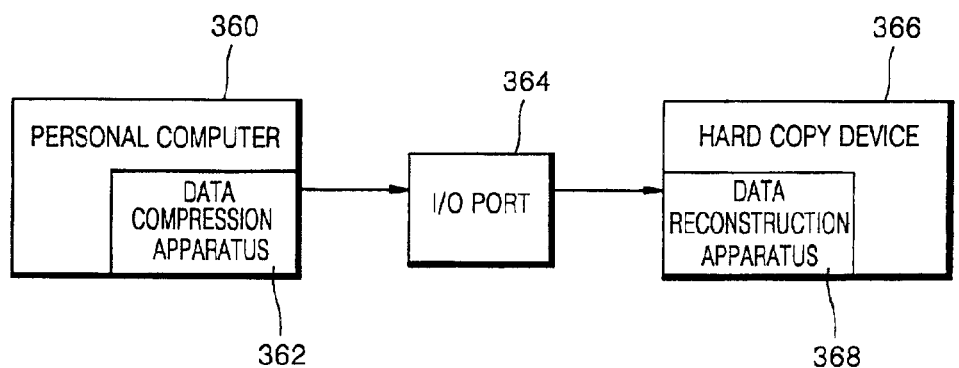
FIG. 30 is a block diagram illustrating an embodiment of a system including data compression and reconstruction apparatuses, in accordance with the principles of the present invention.

FIG. 30 is a block diagram illustrating an embodiment of a system including data compression and reconstruction apparatuses according to the present invention. The system includes a personal computer 360, an input/output (I/O) port 364 and a hard copy device 366.

Referring to FIG. 30, the personal computer 360 outputs data for hard copy to a data compression apparatus 362. The data compression apparatus 362 of the present invention is embedded in the personal computer 360. The data compression apparatus 362 receives source image data for hard copy, compresses the data according to a data compression method according to the present invention described before and outputs the compressed source image data to the I/O port 364. The I/O port 364 sends the compressed source image data received from the data compression apparatus 362 to the hard copy device 366.

A data reconstruction apparatus 368 according to the present invention is embedded in the hard copy device 366. The data reconstruction apparatus 368 reconstructs original source image data from the compressed source image data received from the data compression apparatus 362 through the I/O port 364, and outputs the reconstructed source image data to the hard copy device 366. Then, the hard copy device 366 hard-copies the reconstructed source image data.

As described above, in data compression and reconstruction methods and apparatuses for a hard copy device according to the present invention, transposition is performed before entropy decoding source image data, thereby improving the compression ratio, and the size of a template can be arbitrarily controlled, thereby improving the compression speed. The transposing of bytes can be referred to as a transposing process, for example. The encoding of data can be referred to as an encoding process, for example. The obtaining of a second count value can be referred to as an obtaining process, for example. The FIG. 3 shows the memory storing the source image data before transposition by first data transposer 20.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method of compressing source image data for a hard copy device, the method comprising:

storing the source image data in units of bytes, in a memory in rows and columns;

transposing bytes at each column of the source image data to bytes at each row of the source image data;

determining start information, said start information containing header information and containing information on a chain that was the starting point where compression on the source image data is started;

encoding a plurality of sequential chains and generating compressed data including said encoded chains;

each one of said sequential chains corresponding to one selected from among a current chain alone and the current chain with at least one chain succeeding the current chain, said selecting being in dependence upon whether a dictionary contains chains having same value as the current chain, the dictionary being composed of chains preceding the current chain; and including said start information in said compressed data, each chain being composed of at least two consecutive bytes at a row, neighboring bytes at each row having neighboring memory addresses, offset of neighboring bytes at each column corresponding to width of row of the source image data.

2. The method of claim 1, said encoding and generating further comprising:

reading value of the current chain, said read value corresponding to a first value;

determining whether a matched chain having said first value exists in the dictionary;

when at least one matched chain exists in the dictionary, performing a first process of obtaining a first count value by counting number of said sequential chains having values which match values of chains in the dictionary, and encoding a value of i of the at least one matched chain and the first count value, i being an index indicating each chain included in the dictionary;

when a matched chain does not exist in the dictionary, performing a second process of obtaining a second count value by counting a number of said sequential chains not having values which match values of chains in the dictionary, and storing the value of the current chain;

after performing one selected from among said obtaining of said first count value and said obtaining of said second count value, determining whether the current chain is the last chain to be compressed;

when the current chain is not the last chain, setting a chain succeeding the current chain to be a new current chain and performing said reading of value of the current chain;

when the current chain is the last chain, performing a third process of encoding a predetermined initial value and the second count value in dependence upon the second count value; and synthesizing the start information and the current chain's value stored in said second process with results obtained in said first and third processes to perform said generating of compressed data.

3. The method of claim 2, further comprising:

determining a template comprising chains preceding the current chain, the chains in the template having values selected from among values which are the same as the current chain and values that are similar to the values of the current chain, the dictionary corresponding to the template, said determining of the template being performed after said transposing and before said encoding of the plurality of sequential chains.

4. The method of claim 3, said determining of the template comprising:
obtaining surrounds of respective pseudo-random chains applied to the source image data transposed by said transposing;
counting at least one chain having the same value of each pseudo-random chain in a corresponding surround;
sorting count values by indexes indicating chains included in each surround, said count values being obtained in said counting of the at least one chain having the same value of each pseudo-random chain in a corresponding surround; and
selecting predetermined number m of count values starting from a maximum count value among the sorted count values, m being one selected from among being equal to the number of chains in the surround and being less than the number of chains in the surround, each surround being composed of chains which have been compressed before a corresponding pseudo-random chain is compressed, the template being composed of chains indicated by indexes corresponding to the selected count values.

5. The method of claim 4, the start information being related to a chain which is first compressed among the chains included in the template and which has a history, and the history is composed of at least one previous chain.

6. The method of claim 5, among the chains included in the template, only chains whose values c−T[i] are not negative are included in the dictionary, c indicating the index of the current chain, T[i] indicating the distance between the current chain and a chain indicated by i, and $1 \leq i \leq m$.

7. The method of claim 4, the start information being related to a chain having a maximum T[i] among the chains included in the template, T[i] indicating the distance between the current chain and a chain indicated by i, and $1 \leq i \leq m$.

8. The method of claim 3, said generating of the compressed data further comprising generating compressed source image data in a data format comprising:
chunk data having one selected from among a first group of information and a second group of information, said first group of information corresponding to i and the first count value which are encoded in said first process, said second group of information corresponding to the predetermined initial value and the second count value which are encoded in said third process, the chunk data being one-byte aligned;
chain data having the start information which is not encoded and the value of the current chain which is stored in said second process without being encoded; and
a header having the size of the chain data and the length of the dictionary.

9. The method of claim 8, the chunk data comprising at least M bits and 8-M bits, the M bits indicating one selected from among i of the matched chain and the predetermined initial value, the 8-M bits indicating one selected from among the first count value and the second count value, relationship among M and m being shown by $m=2^{M-1}$.

10. The method of claim 9, the chunk data further comprising additional bits indicating only one selected from among the first count value and the second count value.

11. The method of claim 10, M being a value selected from among 3, 4, 5, and 6.

12. The method of claim 8, said first process further comprising: flushing the second count value when the matched chain exists in the dictionary; and encoding i of the matched chain and the first count value.

13. The method of claim 12, said second process further comprising:
determining and storing the value of the current value as the chain data when the matched chain does not exist in the dictionary;
increasing the second count value by 1;
when the second count value is not the predetermined maximum value, determining whether the second count value is a predetermined maximum value; and
when the second count value is the predetermined maximum value, flushing the second count value.

14. The method of claim 13, said third process further comprising:
determining whether the second count value exceeds a predetermined threshold value when the current chain is the last one to be compressed;
when the second count value does not exceed the predetermined threshold value, terminating the data compression; and
when the second count value exceeds the predetermined threshold value, encoding the predetermined initial value and the second count value and terminating the data compression.

15. The method of claim 2, the dictionary corresponding to a surround comprising all chains preceding the current chain.

16. The method of claim 2, said first process further comprising obtaining the first count value by counting the number of sequential chains having the same value, and run length coding the first count value.

17. The method of claim 1, the dictionary being composed of previous chains compressed before the current chain.

18. The method of claim 1, further comprising hard copying a bilevel screened image using the source image data.

19. The method of claim 1, said encoding further comprising determining result of said encoding.

20. The method of claim 1, said encoding corresponding to entropy encoding.

21. The method of claim 1, the current chain being the chain to be currently compressed.

22. The method of claim 1, each chain comprising two bytes at a row.

23. The method of claim 1, each chain comprising four bytes at a row.

24. An apparatus for compressing source image data, the apparatus comprising:
a first data transposer receiving the source image data, the source image data being stored in units of bytes in rows and columns, said first data transposer transposing bytes at each column to bytes at each row and outputting the result of the transposition;
a template determiner receiving the result of the transposition from said first data transposer and determining a template, the template being composed of previous chains having values selected from among values that are the same as a current chain and values that are similar to the current chain, the current chain being the chain to be currently compressed, the previous chains having been compressed before the current chain is compressed; and an encoder inspecting the template received from said template determiner to determine whether the template has chains having the same value as the current value received from said first data transposer, said inspecting being performed in response to start information containing information on a chain to be first compressed, said encoder encoding sequential chains composed of one selected from among the current chain and the current chain with at least one chain succeeding the current chain, said encoding being performed in response to result of said inspecting, said encoder outputting result of said encoding as result of compressing the source image data;

each chain being composed of at least two consecutive bytes at a row, neighboring bytes at each row having neighboring memory addresses, offset of neighboring bytes at each column corresponding to the row width of the source image data;

the start information and header information being predetermined, provided to said encoder, and included in the result of the compression.

25. The apparatus of claim 24, further comprising a memory storing the source image data in units of bytes in rows and columns, said first data transposer receiving the source image data from said memory.

26. The apparatus of claim 24, said apparatus being used for hard copying a bilevel screened image in a hard copy device, the bilevel screened image corresponding to the source image data.

27. The apparatus of claim 24, said encoder corresponding to an entropy encoder, said encoding corresponding to entropy encoding.

28. The apparatus of claim 24, said encoder comprising:

a data input unit reading value of the current chain received from said first data transposer in response to the start information, the header information, and a first control signal;

a first match inspector inspecting the template received from said template determiner to determine whether a matched chain having the same value as the value read by said data input unit exists in the template;

said first match inspector detecting a first match signal indicating one selected from among the existence and the nonexistence of a matched chain, in dependence upon said inspecting;

said first match inspector detecting i of the matched chain when a matched chain exists, i being an index indicating each chain in the template;

a first counter counting the number of sequential chains having a matched chain in the template in response to the first match signal and outputting the result of the counting as a first count value;

a second counter counting the number of sequential chains, which do not having a matched chain in the template, in response to the first match signal, and outputting the result of the counting as a second count value;

a first encoder encoding the first count value and i of the matched chain received from said first match inspector, and outputting the result of the encoding;

a comparator comparing the second count value with a predetermined threshold value in response to the first control signal, and outputting the result of the comparison;

a second encoder encoding a predetermined initial value which is externally input and the second count value in response to the result of the comparison received from said comparator;

a storage unit storing the results of the encoding received from said first and second encoders, the value of the current chain received from said first data transposer, and the start information which is externally input, in response to the first match signal;

a first controller determining whether the current chain received from said first data transposer is the last chain to be compressed in the source image data and outputting the result of the determination as the first control signal; and a first data output unit synthesizing the start information, the value of the current chain, and the results of the encoding of said first and second encoders which are received from said storage unit and outputting the result of the synthesis as the result of the compression.

29. The apparatus of claim 28, said storage unit comprising:

a first storage unit selectively storing one selected from among the result of the encoding of said first encoder and the result of the encoding of said second encoder as chunk data in response to the first match signal; and a second storage unit storing the value of the current chain and the start information as chunk data in response to the first match signal.

30. The method of claim 24, said entropy decoder comprising:

a data extractor extracting the chunk data from the compressed source image data, in response to the header and the start information received from said information extractor and a second control signal;

a second match inspector inspecting the chunk data to determine whether the chunk data extracted by said data extractor has one selected from among the predetermined initial value and the i of the matched chain, and outputting the result of the inspection as a second match signal;

a first chain reconstructor decoding the second count value contained in the chunk data in response to the second match signal, reconstructing original chains from the compressed chains which do not have matched chains using the chain data extracted from the compressed source image data and the result of said decoding, and outputting the reconstructed chains;

a second chain reconstructor decoding the chunk data in response to the second match signal, reconstructing original chains from the compressed chains having matched chains using the decoded chunk data, and outputting the reconstructed chains;

a second controller determining whether the chunk data received from said data extractor is the last one in the compressed source image data, and outputting the result of the determination as the second control signal; and a second data output unit synthesizing the reconstructed chains received from said first and second chain reconstructors in response to the second control signal, and outputting the result of the synthesis as the result of said entropy decoding.

31. A method of compressing original source image data and then reconstructing the original source image data from the compressed data, the method comprising:

storing the source image data in units of bytes, in a memory in rows and columns;

performing a first transposing process by transposing bytes at each column of the source image data to bytes at each row of the source image data, said first transposing process being performed by a first transposer;

determining start information, said start information containing header information and containing information on a chain that was the starting point where compression on the source image data is started;

encoding a plurality of sequential chains and generating compressed source image data including said encoded chains;

each one of said sequential chains corresponding to one selected from among a current chain alone and the current chain with at least one chain succeeding the current chain, said selecting being in dependence upon whether a dictionary contains chains having same value as the current chain, the dictionary being composed of chains preceding the current chain;

said encoding and generating further comprising:
  reading value of the current chain, said read value corresponding to a first value;
  determining whether a matched chain having said first value exists in the dictionary;
  when at least one matched chain exists in the dictionary, performing a first process of obtaining a first count value by counting number of said sequential chains having values which match values of chains in the dictionary, and encoding value of i of the at least one matched chain and the first count value, i being an index indicating each chain included in the dictionary;
  when a matched chain does not exist in the dictionary, performing a second process of obtaining a second count value by counting number of said sequential chains not having values which match values of chains in the dictionary, and storing the value of the current chain;
  after performing one selected from among said obtaining of said first count value and said obtaining of said second count value, determining whether the current chain is the last chain to be compressed;
  when the current chain is not the last chain, setting a chain succeeding the current chain to be a new current chain and performing said reading of value of the current chain;
  when the current chain is the last chain, performing a third process of encoding a predetermined initial value and the second count value in dependence upon the second count value; and
  synthesizing the start information and the current chain's value stored in said second process with results obtained in said first and third processes to perform said generating of compressed data;
  determining a template comprising chains preceding the current chain, the chains in the template having values selected from among values which are the same as the current chain and values that are similar to the values of the current chain, the dictionary corresponding to the template, said determining of the template being performed after said transposing and before said encoding of the plurality of sequential chains;

said determining of the template further comprising:
  obtaining surrounds of respective pseudo-random chains applied to the source image data transposed by said first transposing process;
  counting at least one chain having the same value of each pseudo-random chain in a corresponding surround;
  sorting count values by indexes indicating chains included in each surround, said count values being obtained in said counting of the at least one chain having the same value of each pseudo-random chain in a corresponding surround; and
  selecting predetermined number m of count values starting from a maximum count value among the sorted count values, m being one selected from among being equal to the number of chains in the surround and being less than the number of chains in the surround, each surround being composed of chains which have been compressed before a corresponding pseudo-random chain is compressed, the template being composed of chains indicated by indexes corresponding to the selected count values;

said generated compressed data having a data format comprising:
  chunk data having one selected from among a first group of information and a second group of information, said first group of information corresponding to i and the first count value which are encoded in said first process, said second group of information corresponding to the predetermined initial value and the second count value which are encoded in said third process, the chunk data being one-byte aligned;
  chain data having the start information which is not encoded and the value of the current chain which is stored in said second process without being encoded; and
  header data having the size of the chain data and the length of the dictionary.

32. The method of claim 31, further comprising reconstructing original source image data from the compressed source image data, said reconstructing comprising:
  performing a first extracting process by extracting the header and the start information from the compressed source image data;
  performing a first decoding process by decoding compressed chains contained in the chunk data and the chain data which are extracted from the compressed source image data, using the header and the start information extracted by said first extracting; and
  performing a second transposing process by transposing bytes at each column to bytes at each row in the result of said first decoding and determining the result of the transposition as reconstructed source image data.

33. The method of claim 32, said first decoding process further comprising:
  performing a second extracting process by extracting the chunk data from the compressed source image data using the header and the start information;
  determining whether the chunk data extracted in said second extracting has one selected from among the predetermined initial value and the i of the matched chain;
  when the chunk data has the predetermined initial value, performing a second decoding process by decoding the second count value contained in the chunk data, and reconstructing original chains from the compressed chains which do not have matched chains using the chain data extracted from the compressed source image data and the result of said decoding;
  when the chunk data has the i of the matched chain, performing a third decoding process by decoding the chunk data and reconstructing original chains from the compressed chains having matched chains using the decoded chunk data;

determining whether the chunk data is the last one in the compressed source image data and proceeding to said second extracting process when the chunk data is not the last one; and when the chunk data is the last one, synthesizing the chains reconstructed in one decoding process selected from among said second and third decoding processes, to generate the result of said first decoding process.

34. The method of claim 31, further comprising reconstructing original source image data from the compressed source image data, said reconstructing comprising:

extracting the header and the start information from the compressed source image data which is input, said extracting being performed by an information extractor;

entropy decoding compressed chains contained in the chunk data and the chain data which are extracted from the compressed source image data, in response to the header and the start information received from said information extractor, and outputting the result of the entropy decoding, said entropy decoding being performed by an entropy decoder connected to said information extractor; and performing a second transposing process by transposing bytes at each column to bytes at each row in the result of said entropy decoding received from said entropy decoder, and outputting the result of the transposition as reconstructed source image data.

35. The method of claim 34, said second transposing process being performed by a second data transposer.

36. The method of claim 34, further comprising:

performing said compressing of the source image data in a computer;

transmitting the compressed source image data from the computer to a hard copy device;

performing said reconstructing of the original source image data in the hard copy device; and printing data on a transparent medium, said data corresponding to the source image data, said printing being performed by the hard copy device.

* * * * *